US012698007B2

(12) United States Patent
Yang et al.

(10) Patent No.: US 12,698,007 B2
(45) Date of Patent: Aug. 4, 2026

(54) BEHAVIOR PLANNING FOR AUTONOMOUS VEHICLES IN YIELD SCENARIOS

(71) Applicant: NVIDIA Corporation, Santa Clara, CA (US)

(72) Inventors: Fangkai Yang, Seattle, WA (US);
David Nister, Bellevue, WA (US);
Yizhou Wang, San Ramon, CA (US);
Rotem Aviv, San Diego, CA (US);
Julia Ng, San Jose, CA (US); Birgit Henke, Seattle, WA (US); Hon Leung Lee, Bellevue, WA (US); Yunfei Shi, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 95 days.

(21) Appl. No.: 18/602,802

(22) Filed: Mar. 12, 2024

(65) Prior Publication Data

US 2024/0217557 A1     Jul. 4, 2024

Related U.S. Application Data

(63) Continuation of application No. 17/395,318, filed on Aug. 5, 2021, now Pat. No. 11,926,346.

(51) Int. Cl.
*B60W 60/00*     (2020.01)
*B60W 30/18*     (2012.01)
*G08G 1/0967*    (2006.01)

(52) U.S. Cl.
CPC .. *B60W 60/0027* (2020.02); *B60W 30/18154* (2013.01); *B60W 30/18159* (2020.02);
(Continued)

(58) Field of Classification Search
CPC ....... B60W 60/0027; B60W 30/18154; B60W 30/18159; B60W 2552/05; B60W 30/095; G08G 1/096725
See application file for complete search history.

(56) References Cited

U.S. PATENT DOCUMENTS

| | | | |
|---|---|---|---|
| 10,885,698 | B2 | 1/2021 | Muthler et al. |
| 11,926,346 | B2 | 3/2024 | Yang et al. |

(Continued)

FOREIGN PATENT DOCUMENTS

| | | |
|---|---|---|
| CN | 109491375 A | 3/2019 |
| CN | 110352153 A | 10/2019 |

(Continued)

OTHER PUBLICATIONS

IEC 61508, "Functional Safety of Electrical/Electronic/Programmable Electronic Safety-related Systems," https://en.wikipedia.org/wiki/IEC_61508, accessed on Apr. 1, 2022, 7 pgs.

(Continued)

*Primary Examiner* — Khoi H Tran
*Assistant Examiner* — Tristan J Greiner
(74) *Attorney, Agent, or Firm* — IRON SUMMIT IP LLP

(57)     ABSTRACT

In various examples, a yield scenario may be identified for a first vehicle. A wait element is received that encodes a first path for the first vehicle to traverse a yield area and a second path for a second vehicle to traverse the yield area. The first path is employed to determine a first trajectory in the yield area for the first vehicle based at least on a first location of the first vehicle at a time and the second path is employed to determine a second trajectory in the yield area for the second vehicle based at least on a second location of the second vehicle at the time. To operate the first vehicle in accordance with a wait state, it may be determined whether there is a conflict between the first trajectory and the second
(Continued)

trajectory, where the wait state defines a yielding behavior for the first vehicle.

20 Claims, 13 Drawing Sheets

(52) U.S. Cl.
CPC . _G08G 1/096725_ (2013.01); _B60W 2420/403_ (2013.01); _B60W 2420/408_ (2024.01); _B60W 2552/05_ (2020.02)

(56) References Cited

U.S. PATENT DOCUMENTS

| | | | | |
|---|---|---|---|---|
| 2016/0176399 | A1* | 6/2016 | Takagi | B60W 30/18154 701/301 |
| 2017/0010618 | A1* | 1/2017 | Shashua | G01C 21/30 |
| 2018/0253102 | A1* | 9/2018 | Appelt | B60W 10/18 |
| 2019/0079528 | A1* | 3/2019 | Zhu | B60W 60/0011 |
| 2019/0088148 | A1* | 3/2019 | Jacobus | G08G 1/005 |
| 2021/0055733 | A1 | 2/2021 | Beller et al. | |
| 2021/0089041 | A1 | 3/2021 | Das Gupta et al. | |
| 2021/0122373 | A1* | 4/2021 | Dax | B60W 30/18159 |
| 2021/0370921 | A1* | 12/2021 | Silva | B60W 60/0027 |
| 2022/0105959 | A1* | 4/2022 | Hartnett | B60W 50/0097 |
| 2022/0153307 | A1* | 5/2022 | Choi | G06V 10/82 |

FOREIGN PATENT DOCUMENTS

| | | |
|---|---|---|
| CN | 112740299 A | 4/2021 |
| JP | 2021064033 A | 4/2021 |
| WO | 2020061214 A1 | 3/2020 |

OTHER PUBLICATIONS

ISO 26262, "Road vehicle—Functional safety," International standard for functional safety of electronic system, https://en.wikipedia.org/wiki/ISO_26262, accessed on Sep. 13, 2021, 8 pgs.

"Taxonomy and Definitions for Terms Related to Driving Automation Systems for On-Road Motor Vehicles", Society of Automotive Engineers (SAE), Standard No. J3016-201609, pp. 30 (Sep. 30, 2016).

"Taxonomy and Definitions for Terms Related to Driving Automation Systems for On-Road Motor Vehicles", Society of Automotive Engineers (SAE), Standard No. J3016-201806, pp. 35 (Jun. 15, 2018).

Yang, Fangkai; Non-Final Office Action for U.S. Appl. No. 17/395,318, filed Aug. 5, 2021, mailed May 12, 2023, 57 pgs.

Yang, Fangkai; Notice of Allowance for U.S. Appl. No. 17/395,318, filed Aug. 5, 2021, mailed Nov. 9, 2023, 16 pgs.

Yang, Fangkai; First Office Action for Chinese Patent Application No. 202210836624.1, filed Jul. 15, 2022, mailed Jul. 24, 2025, 25 pgs.

Yang, Fangkai; First Office Action for Japanese Patent Application No. 2022-088236, filed May 31, 2026, mailed Feb. 12, 2026, 9 pgs.

* cited by examiner

Figure 3:
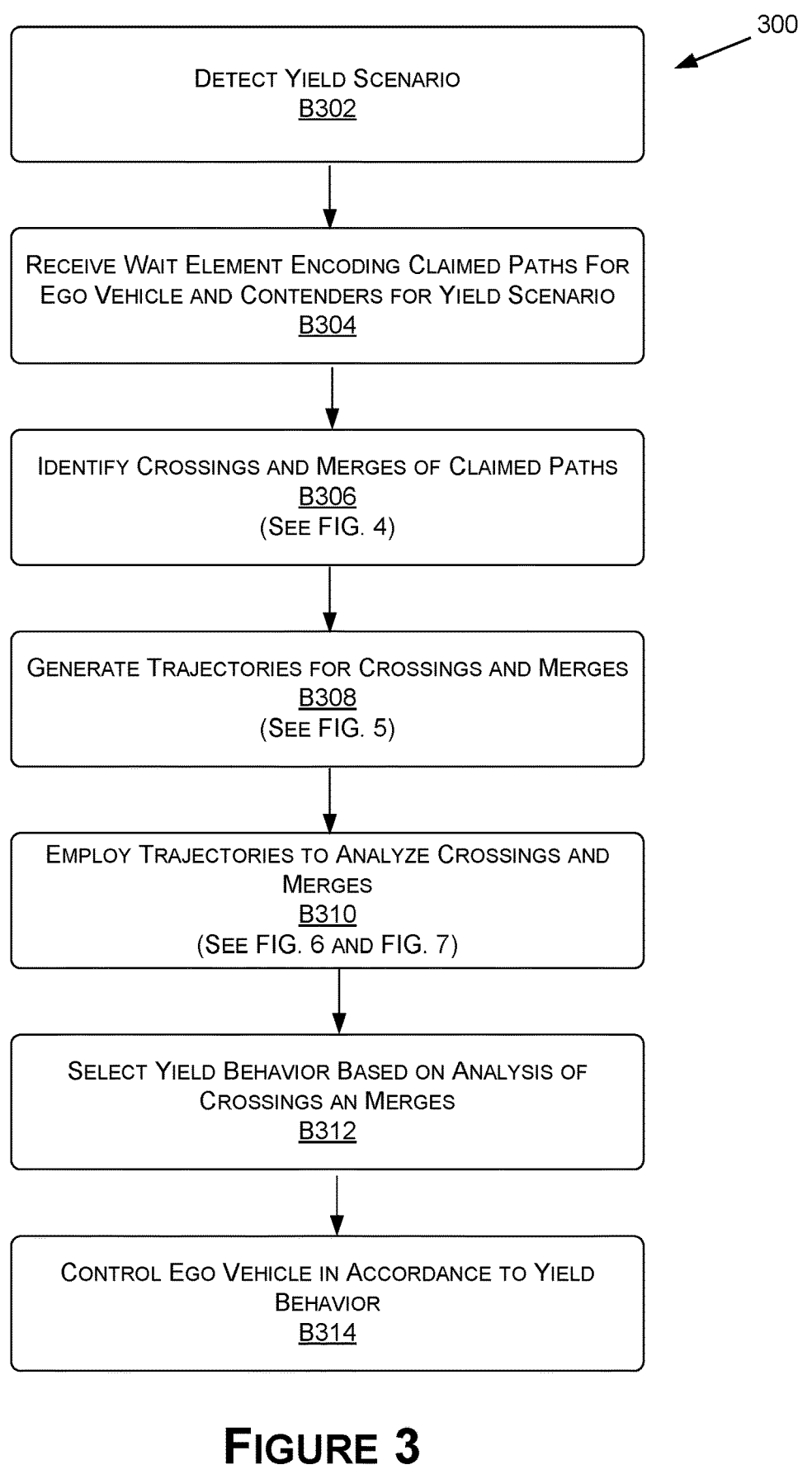

300

DETECT YIELD SCENARIO
B302

RECEIVE WAIT ELEMENT ENCODING CLAIMED PATHS FOR
EGO VEHICLE AND CONTENDERS FOR YIELD SCENARIO
B304

IDENTIFY CROSSINGS AND MERGES OF CLAIMED PATHS
B306
(SEE FIG. 4)

GENERATE TRAJECTORIES FOR CROSSINGS AND MERGES
B308
(SEE FIG. 5)

EMPLOY TRAJECTORIES TO ANALYZE CROSSINGS AND
MERGES
B310
(SEE FIG. 6 AND FIG. 7)

SELECT YIELD BEHAVIOR BASED ON ANALYSIS OF
CROSSINGS AN MERGES
B312

CONTROL EGO VEHICLE IN ACCORDANCE TO YIELD
BEHAVIOR
B314

STEREO CAMERA 868

MID-RANGE CAMERA, WING MIRROR MOUNT 898

SURROUND CAMERA 874

MID-RANGE CAMERA, WING MIRROR MOUNT 898

SURROUND CAMERA(S) 874

SURROUND CAMERA(S) 874

INFRARED CAMERA 872

WIDE VIEW CAMERA 870

LONG-RANGE CAMERA 898

LONG-RANGE CAMERA 898

STEREO CAMERA 868

800

1000

BEHAVIOR PLANNING FOR AUTONOMOUS VEHICLES IN YIELD SCENARIOS

CROSS-REFERENCE TO RELATED APPLICATIONS

This application is a continuation of U.S. patent application Ser. No. 17/395,318, filed Aug. 5, 2021, which is incorporated herein by reference in its entirety.

BACKGROUND

Advances in machine-vision methods, neural network architectures, and computational substrates are beginning to enable autonomous vehicles, such as but not limited to land-based autonomous vehicles (e.g., self-driving cars and trucks). For the public and governmental regulatory agencies to accept a wide deployment of self-driving cars and trucks on roadways, the self-driving cars and trucks must achieve a safety-level that surpasses the current safety-level of an average human driver. Safe and effective driving requires drivers to have confidence that other vehicles in the area will appropriately yield when obligated. If a vehicle fails to yield, drivers of other nearby vehicles may be unable to proceed in a safe and efficient manner due to the "unpredictability" of other drivers, e.g., drivers that have provided a behavioral cue that they may fail to yield when obligated. Thus, a necessary condition for the deployment of self-driving cars and trucks includes the capability to successfully, safely, and "politely" negotiate yield scenarios— scenarios in which yielding may be appropriate (e.g., intersections and merging lanes).

Typically, the local traffic regulations and driving norms and practices of the area dictate which vehicle operators (and under what conditions) have a responsibility or obligation to yield to others. Such regulations include traffic laws (e.g., vehicles must yield to pedestrians at a crosswalk), signage specific to the situation (e.g., a street sign that indicates which in-roads to an intersection have a responsibility to yield to other in-roads), and other real-time cues (e.g., a near-simultaneous arrival of multiple cars at a traffic circle). However, conventional autonomous vehicles are incapable of encoding and deploying such protocols. Instead conventional systems may aim to avoid collisions while failing to account for yielding protocols, and therefore cannot safely and predictably navigate yield scenarios, or conversely, yield indefinitely until no other vehicles are in the region of contention.

SUMMARY

Embodiments of the present disclosure relate to behavior planning for autonomous vehicles in yield scenarios. Systems and methods are disclosed that provide the real-time control of land-based autonomous vehicles when the vehicles are approaching a yield scenario.

In contrast to conventional systems, such as those described above, disclosed embodiments enable autonomous vehicles to negotiate yield scenarios in a safe and predictable manner. In at least one embodiment, a yield scenario may be identified for a first vehicle by analyzing sensor data generated by a sensor of the first vehicle in an environment. One or more wait elements may be received in association with the yield scenario. A wait element may be a wait element data structure. The wait element data structure may encode various aspects of the associated yield scenario. A wait element may encode a wait state, wait geometry, and/or ego information for a particular contention between the ego and a contender. A wait element may be used to encode a first path for the first vehicle to traverse a yield area in the environment, and a second path for a second vehicle to traverse the yield area. The first path may be used to determine a first trajectory in the yield area for the first vehicle based at least on a first location of the first vehicle at a time (e.g., a current time). The second path may be used to determine a second trajectory in the yield area for the second vehicle based at least on a second location of the second vehicle at the time. The trajectories may be used to evaluate whether there is a conflict between the first trajectory and the second trajectory based on a wait state associated with the wait element. By evaluating the potential for conflicts between the two trajectories, the wait state can be used to define a yielding behavior for the first vehicle.

BRIEF DESCRIPTION OF THE DRAWINGS

The present systems and methods for behavior planning for autonomous vehicles in yield scenarios are described in detail below with reference to the attached drawing figures, wherein:

FIG. 3 is a flow diagram showing a method for controlling an autonomous vehicle (e.g., an ego vehicle), in accordance with some embodiments of the present disclosure;

DETAILED DESCRIPTION

Figure 1:
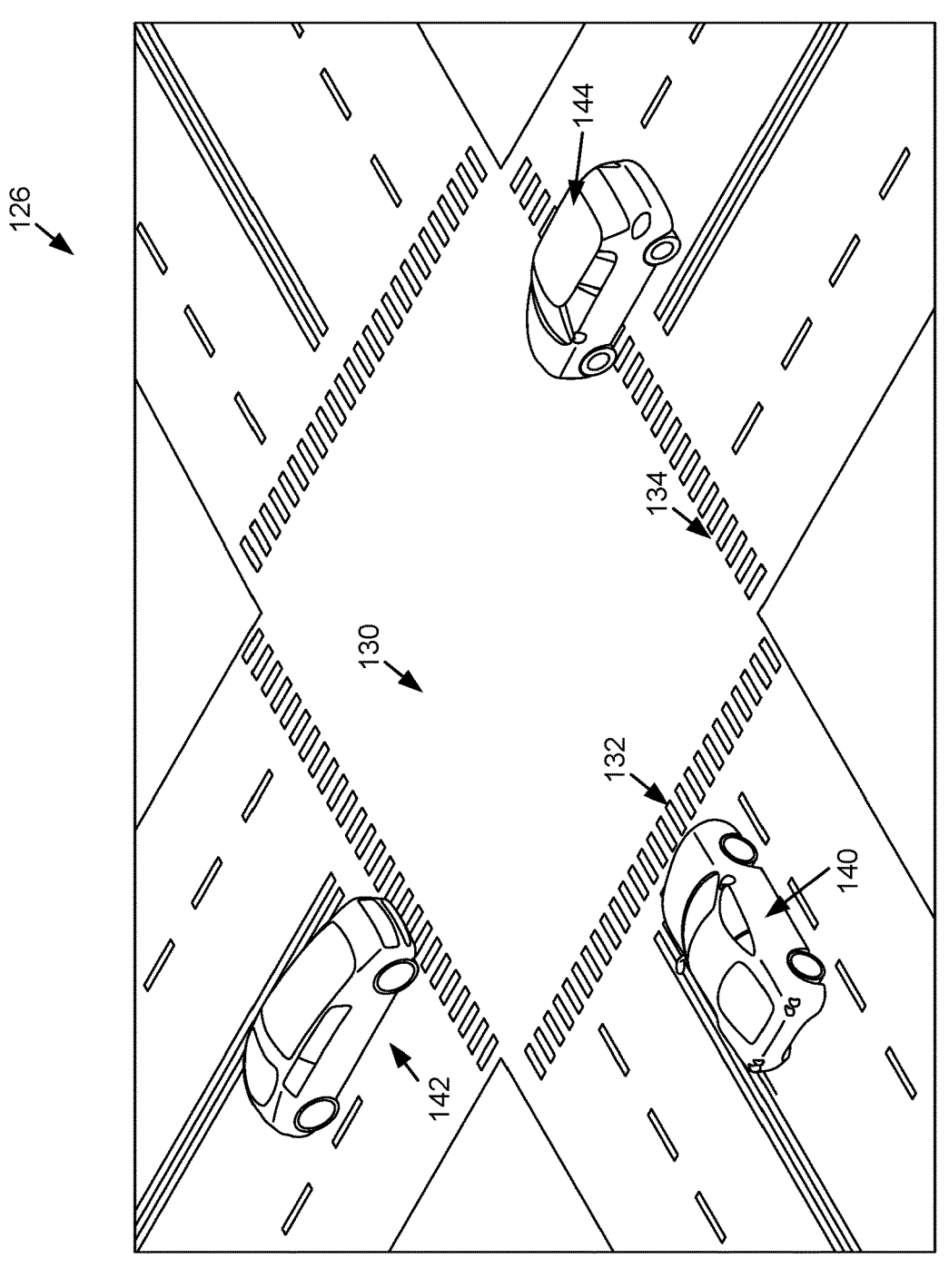
FIG. 1 is an example of a yield planner system, in accordance with some embodiments of the present disclosure.

Systems and methods are disclosed related to behavior planning for autonomous vehicles in yield scenarios. Although the present disclosure may be described with respect to an example autonomous vehicle 800 (alternatively referred to herein as "vehicle 800" or "ego-vehicle 800," an example of which is described with respect to FIGS. 8A-8D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to controlling a land-based autonomous vehicle for negotiating a yield scenario, this is not intended to be limiting, and the systems and methods described herein may be used in augmented reality, virtual reality, mixed reality, robotics, security and surveillance, autonomous or semi-autonomous machine applications, and/or any other technology spaces where autonomous control systems may be used.

In the normal course of operating an autonomous vehicle, a control agent must avoid both moving and non-moving obstacles (e.g., other vehicles, pedestrians, bicyclists, lane barriers, and the like). In addition to avoiding collisions, an agent has a fundamental responsibility to yield to other roadway users in certain scenarios (e.g., "yielding conditions"). Such yielding conditions may exist at (controlled and un-controlled) intersections, crosswalks, merging lanes, highway (or interstate) on/off ramps, traffic circles, and the like such as navigating parking structures and/or lots. In order to allow another user to safely, confidently, and efficiently "clear" the yielding condition, yielding behavior may involve deaccelerating, or even bringing the vehicle to a complete stop. For instance, in an unmarked intersection where another car has previously arrived, a subsequent arriving car may deploy appropriate yielding behavior by slowing down to enable the first car to safely clear the intersection. Such yielding behavior insures that the subsequent car does not enter the intersection until the first car has safely cleared the intersection. Under such yield conditions, one or more users may have a clearly defined obligation (or responsibility) to yield to other users.

Yielding behavior provides utility beyond just avoiding collisions. Proper yielding behavior may insure "polite" and "expected" driving dynamics, which are required for safe and efficient transportation. For example, even if an agent acts to avoid a potential collision under a yield condition (e.g., by accelerating through an intersection), failing to yield when there is an obligation to do so do creates tense and anxious driving conditions for all users in the area. Even if one accelerates to avoid a collision, an unyielding vehicle may generate anxiety, a feeling of danger, and anger (e.g., road rage) in other drivers, bicyclists, and pedestrians. That is, even if a collision is avoided by taking aggressive action; the collision was not avoided in a "safe and polite manner," as expected by other users. Accordingly, in operating an autonomous vehicle, an agent for the autonomous vehicle may be obligated (e.g., either legally or normatively) to adopt one or more behavioral yield strategies when approaching a yield scenario.

In contrast to conventional systems, the disclosure provides for a "yield planner" for an autonomous vehicle ("ego-vehicle") that may actively monitor for the arrival of one or more yield conditions (e.g., the vehicle is arriving at an intersection, the vehicle is negotiating an on/off ramp, or the vehicle is preparing to change lanes). When a yield condition is detected, the yield planner may determine appropriate yielding behavior (e.g., stop at entry, take way, etc.). When a control agent for the ego-vehicle adopts the determined yield behavior, the ego-vehicle may safely satisfy its required and expected yielding obligations, while avoiding collisions.

In operation, the yield planner may analyze the relationship between the ego-vehicle's longitudinal progress forward (e.g., forward-looking in time) and the longitudinal progress forward of other traffic actors (e.g., contenders). The yield planner may determine yielding behavior for the ego-vehicle and contenders, and predict whether contenders are yielding appropriately when expected. When approaching a driving scenario that may involve yielding (e.g., a yield scenario), the yield planner may receive one or more wait elements that may encode such information as one or more wait states (that define specific yield behavior), a set of "claimed paths" or lanes at least partially in a yield area for the ego-vehicle, as well as sets of claimed paths or lanes at least partially in the yield area for each contender relevant to the yield scenario.

Forward simulations of the claimed paths may be performed to generate trajectories (paths may be assumed to exist outside of a temporal dimension, whereas trajectories may be embedded within a space-time manifold). The trajectories may be tested to determine whether the ego-vehicle's trajectory is within a yield area during the time that a contender's trajectory is within the yield area. The world may be modeled as a two-dimensional spatial terrain, with spatial coordinates (x, y) and actors moving along in time t. For any time t, claimed sets of the vehicles may be considered. The claimed sets may also extend in time (in the future forward from t). Thus, the claimed sets may exist in a time-evolving 3D space-time manifold. Multiple different times may be considered, and thus the yield planner's analysis may operate in at least a 4D space-time manifold having two spatial dimensions and two temporal dimensions. The two temporal coordinates may be related, and thus may be collapsed into a single temporal coordinate, via this relationship. However, embodiments may keep the temporal axes separate to simplify the analysis of the vehicles' trajectories through space-time. The temporal coordinate related to sweeping out the claimed sets may be denoted as z, parameterizing the 3D space of claimed sets.

The yield planner's analysis may be divided into multiple stages. A first stage may find interference pairings (or contention points) between points on the paths in terms of crossings (represented as path interval pairs that are determined to interfere as a whole) and merges (represented as path interval pairs that are determined to be the same or at least similar). A second stage may consider how actors and their claimed sets progress along their individual paths.

In the first stage, the claimed paths may be employed to identify all potential interferences between the ego-vehicle and each of the contenders. The physical extensions of the ego-vehicle and the contenders may be modeled as bounding boxes (or shapes) around the claimed paths. In the second stage, for each potential interference, multiple trajectories may be determined (each trajectory beginning at subsequent temporal values). Each trajectory may be modeled as a second order dynamical equation that assumes upper bounds for the magnitude of each of the vehicles' accelerations. The dynamical equations may be employed to determine an intersection in the temporal ranges the vehicles spend within the yield area (according to the modeled trajectories). A yielding behavior may be selected for the ego-vehicle, depending upon whether the determined intersection of the temporal ranges is the null set or is a non-empty set (e.g., to advance or remain on a wait state of a state machine of one or more wait states that control yielding behavior).

With reference to FIG. 1, FIG. 1 is an example of a yield planner system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

As noted above, performing a yielding behavior may be a required when operating a vehicle (e.g., a car, truck, motorcycle, scooter, or the like) subject to "rules of the road." A scenario or situation that gives rises to a required yielding behavior may be referred to as a yield (or yielding) scenario. Examples of yield scenarios include scenarios where multiple actors (e.g., vehicles, pedestrians, bicyclists, and the like) are present, and may include roadway elements such as but not limited to multi-way intersections, merging lanes, off/on ramps for interstates or highways, traffic lights and/or signs, crosswalks, construction zones, parking lots/ structures, traffic circles, and the like. To ensure safe and polite navigation of roadways, a yield scenario may include legally-enforced yield obligations and/or socially-enforced yield obligations (e.g., normative yield obligations). When approaching a yield scenario, a control agent for an autono- mous vehicle (e.g., first vehicle 140) may employ the yield planner system 100 to detect the yield scenario and deter- mine a yield behavior for the vehicle that will satisfy the autonomous vehicle's legal and normative yield obligations.

In general, the yield planner system 100 may receive sensor data, encoding one or more aspects of an environment 126, and use the sensor data to detect a yielding scenario. In response to detecting a yielding scenario, the yield planner system 100 may determine appropriate behavior (e.g., a yield behavior) for an example autonomous vehicle 140 (alternatively referred to herein as a "first vehicle 140" or an "autonomous vehicle 140"), an example of which is described in more detail herein with respect to FIGS. 8A-8D, in the event that a yield scenario is detected using the sensor data. The determined yield behavior may be provided to a control system (or control agent) of the autonomous vehicle 140. The control agent may operate the vehicle 140 in accordance with the determined yield behav- ior, such that the vehicle 140 successfully navigates the yield scenario. In embodiments, successfully navigating a yield scenario may include the vehicle 140 successfully avoiding collisions with other actors associated with the yield scenario, while simultaneously satisfying the vehicle's 140 legal and normative yielding responsibilities, e.g., the vehicle 140 "clears" the yield scenario without incidence and in a "safe and polite manner," as expected by others. The yield planner system 100 may be a sub-system of the vehicle's 140 control system (e.g., the vehicle's control agent). For clarity and brevity, other components of the vehicle's 140 control system, outside of the yield planner system 100, are not shown in FIG. 1.

The yield scenario depicted in the environment 126 is an intersection-based yield scenario (e.g., an intersection) that includes the autonomous vehicle 140 approaching a yield area 130 (e.g., the center of the intersection where the autonomous vehicle 140 and one or more other actors may potentially collide). In addition to the autonomous vehicle 140, the yield scenario (depicted in FIG. 1) includes addi- tional vehicles 142 and 144 approaching, arriving at, and/or navigating through the yield area 130. For clarity purposes, the autonomous vehicle 140 may be referred to as a first vehicle 140 (or an ego-vehicle 140), the additional vehicle 142 may be referred to as a second vehicle 142, and the additional vehicle 144 may be referred to as a third vehicle 144. Because embodiments are directed towards controlling the yield behavior of the first vehicle 140, other actors that the first vehicle must avoid (e.g., the second vehicle 142 and the third vehicle 144) may be referred to as contenders.

Contenders may but need not be vehicles, and may include other actors such as, but not limited to pedestrians, bicyclists, and the like. Contenders that are generally con- strained via a roadway may be referred to as non-holonomic contenders, while contenders with greater degrees-of-free- dom (e.g., contenders that are not necessarily constrained by the roadway) may be referred to as holonomic contenders. For example, cars, trucks, and motorcycles may be referred to as non-holonomic contenders, while pedestrians and bicyclists may be referred to as holonomic contenders. In general, because of lesser degrees-of-freedom (DOF), the forward-looking paths of non-holonomic contenders may be predicted somewhat more confidently than the behavior of holonomic contenders. Although not shown in FIG. 1, the environment 126 may include additional and/or alternative contenders, such as additional non-holonomic contenders as well as one or more holonomic contenders (e.g., one or more pedestrians in one or more cross-walks of the intersection). The combination of the vehicle 140 and each of the relevant contenders associated with a yield scenario may be collec- tively referred to as the actors associated with the yield scenario.

It should be understood that the embodiments are not limited to a yield scenario that includes a four-way inter- section (e.g., the yield area 130) with three vehicles (the first vehicle 140, the second vehicle 142, and the third vehicle 144) occupying three of the four prongs of the intersection. Rather, as discussed throughout, a yield scenario may addi- tionally include intersections with less numbers of incom- ing/outgoing paths (e.g., three way intersection, T-intersec- tions, and the like), as well as intersections with greater numbers of incoming/outgoing paths (e.g., five-way inter- sections, six-way intersections, traffic circles, and the like). Additional yield scenarios may include merging traffic (e.g., vehicle lane changes, off/on ramps for interstates/highways, and the like). Yield scenarios can be classified into multiple categories: crossings (e.g., such as that depicted in FIG. 1) and merges (e.g., traffic merging on an on/off ramp).

Each actor may be subject to a finite maximum positive acceleration and a finite minimum negative acceleration, e.g., any vehicle's accelerating and braking capabilities are finite. Assuming an actor's velocity is non-zero (e.g., relative to the Earth's surface), then at any point in time, each actor may not be able to avoid a bounded set of spatial points due to momentum. The set of unavoidable spatial points may be dependent upon the finite acceleration and breaking capabilities of the actor, as well as the actor's current position in phase space (e.g., the actor's current spatial position and velocity, relative to the Earth's surface) and the finite reaction time of the agent's control system. The set of unavoidable spatial points may be interchangeably referred to a claimed points, a claimed set, claimed paths, and/or set of claimed points.

A continuous set of claimed points may define a claimed path that the actor is committed to traversing in the near future. In one or more embodiments, the control system of the first vehicle 140 may be enabled to determine, at any point in time, the claimed paths of the first vehicle 140, as well as to estimate the claimed paths for each contender. The control system of the first vehicle 140 may also be enabled to take any reasonable action to avoid claiming any point or path that includes points that are already claimed by a contender, unless the contender "releases" their claimed points via an action (e.g., accelerates, decelerates, turns, etc.).

To perform these functionalities, the yield planner system 100 may include, for example, a yield scenario detector 102, a wait element receiver 104, a trajectory generator 106, a scenario analyzer 110, a yield behavior predictor 112, and a control planner 114.

The yield scenario detector 102 is generally responsible for detecting a yield scenario. That is, the yield scenario detector 102 detects a situation where a crossing or a merging interference pattern has a significant likelihood of arising. In some embodiments, the yield scenario detector 102 is enabled to detect an intersection or a merging yield scenario, where there is a substantial likelihood that the first vehicle 140 has a yielding responsibility. In some embodiments, the yield scenario detector 102 may receive one or more signals from other components of the first vehicle 140 to employ in the detection of a yield scenario. In at least one embodiment, the yield scenario detector 102 may receive a yield signal, generated by another component, where the yield signal encodes the detection of an approaching yield scenario. Whether the yield scenario is detected directly by the yield scenario detector 102, or by other components of the first vehicle, the yield scenario may be detected by analyzing sensor data generated by sensors of the first vehicle 140 in the environment 126. For example, a yield scenario may be detected based at least on localizing the vehicle 140 to a map (e.g., using computer vision and/or GPS data), where the map may identity a location of a yield scenario with respect to the vehicle 140. Additionally or alternatively, computer vision may be used to classify one or more locations in one or more images of the environment as corresponding to a yield scenario. In at least one embodiment, the yield scenario detector 102 may detect a yield scenario based at least on determining if a set of base rules (traffic rules) apply to a scene and provide corresponding wait elements. In at least one embodiment, the yield scenario detector 102 may detect a yield scenario based at least on applying rules encoded in the map, resolved with signal states if applicable (e.g., traffic signs, lights, etc.) and provide corresponding wait elements.

The wait element receiver 104 is generally responsible for receiving a wait element data structure. A portion of the first vehicle's 140 operating system that is upstream from the yield planner system 100 may generate the wait element data structure. The wait element data structure may encode various aspects of a yield scenario. Thus, the wait element may be associated with a detected yield scenario. A wait element may encode a wait state, wait geometry, and/or ego information for a particular contention between the ego and a contender. A wait group may represent a group of wait elements for a particular yield area (e.g., an intersection, merge area, etc.) and/or scenario. In at least one embodiment, all wait conditions in a wait group may need to be considered together and cleared together. This may prevent such situations as the vehicle 140 being stuck waiting for pedestrians at the end of a left turn while still in the path of oncoming traffic by considering the oncoming traffic contention together with the pedestrian crossing contention in the same wait group.

Wait geometry may correspond to geometry that results when applying information about wait conditions or yield scenarios to a lane graph. Wait geometry may apply to an ego path (such as an entry line), a contender path (such as a contender area), or to a background context (such as the inside ground of an intersection, or the presence of an intersection entry line). Wait geometry may include: entry lines and exit lines (for both ego paths and contender paths), entry and exit contender areas (for both ego paths and contender paths), an intersection entry line and inside ground (as part of the general context of a wait group), and/or contention points between an ego path and a contender path (in embodiments where an explicit encoding of one of the crossing or merge points between paths is used). A speed limit may be applied between an entry line and exit line. Each of these items may be encoded as invalid to accommodate encoding wait conditions where the items do not apply (for example an on-ramp traffic light only has an ego path and an entry line, but no exit line, contender path, or inside ground). Another example would be an encoding of a new speed limit by a wait group containing only an entry line and a speed limit in the overall context, and everything else set to invalid. The exit line may then to be interpreted as infinite or until further notice, and similarly for other properties.

An entry line for an ego path may encode a stopping point for several of the yielding behaviors. An entry line may also signal a beginning of a general contention area (which may also be referred to as a yield area), and may be book-ended by an exit line. An exit line may be used to determine which segment of an ego path needs to be cleared to clear a wait group of wait conditions. Wait geometry may also include inside ground area, which may represent the inside ground of an intersection or other yield area as a polygonal area. In some cases, an inside ground area may cover a segment between an entry line and an exit line (sometimes the exit line is moved out such as beyond a pedestrian crossing even though the inside ground is not). Entry contender areas and inside ground may provide context for analyzing other actors. This may be performed by the scenario analyzer 110 assigning actors to paths and areas (in a non-mutually exclusive way). The geometry of ego and contender paths as well as the contention point may be used by the yield planner system 100 to implement yielding as required. The geometry may also be used to determine which rules apply.

A contention point may represent an explicit geometric point, but also represent a particular contention that a wait element is referring to and is encoding the state of. In this sense, the state of contention at a contention point may represent a payload of a contention state resolution process. Contention state resolution may provide, for each contention point, a determination of a manner in which the vehicle 140 should or not yield (yield behavior) with respect to the contention point. In this sense a contention point may be used to, given a choice of ego path, access a contender path and via that contender path, actual contenders and yield behavior relative to them.

In at least one embodiment, a wait element may include some subset of the wait geometry of one ego path, the wait geometry of one contender path, a wait geometry context, and a state of contention. One or more of these items can be encoded as invalid if it is not applicable. The wait elements may constitute 'atoms' of how information about wait conditions are encoded so that they can be passed to the yield planner system 100.

The trajectory generator 106 is generally responsible for generating the trajectories for the autonomous vehicle 140, and each of the other contenders relevant to the yield scenario encoded in the one or more wait elements received by the wait element receiver 104. The trajectories generated by the trajectory generator 106 include 1D structures embedded within a 4D flat space-time manifold, as discussed herein. The scenario analyzer 110 is generally responsible for analyzing the first vehicle's 140 one or more trajectories and one or more trajectories for each contender in the yield scenario to determine the likelihood of one or more potential collisions within an intersection-based yield scenario, such as but not limited to the one shown in FIG. 1.

The scenario analyzer 110 may additionally or alternatively analyze the first vehicle's 140 trajectories and the trajectories for each contender in the yield scenario to determine the likelihood of one or more potential collisions within a merge-based yield scenario (e.g., merging onto a freeway). Based on the intersection or merging analysis performed by the scenario analyzer 110, the yield behavior predictor 112 determines a yield behavior (or yield action), in which to control the first vehicle 140.

When approaching a yield scenario, the yield planner system 100 (via the yield behavior predictor 112) may perform a yielding analysis (based on the analysis of the scenario analyzer 110 and/or scenario analyzer 110) to determine a yield behavior (e.g., a yield action) for the first vehicle 140. When the vehicle 140 acts in accordance to the determined yield behavior, the probability that any resulting claimed set of points (of the first vehicle 140) will intersect with the claimed set of each of the other contenders is significantly reduced, even if one or more contenders are not meeting their yield obligations. That is, the yield planner system 100 may ensure that, at least for yield scenarios, the claimed sets of the first vehicle 140 do not intersect the claimed sets associated with the contenders, even if the contenders do not actively contribute to avoiding the first vehicle 140.

The yield planner system 100 may also ensure that the first vehicle's 140 claimed set maintains a sufficient margin from interference with the contenders' claimed sets. The margin is sufficient, such that while the first vehicle 140 is operated in accordance to the determined yield behavior, the navigation of the first vehicle 140 indicates to the contenders that the first vehicle 140 is conforming to their legal and normative yielding obligations.

In at least one embodiment, the yield behavior predictor 112 may determine yield behavior based at least on performing contention state resolution for the yield scenario. This may include determining information associated with one or more of the first vehicle 140, the second vehicle 142, and/or the third vehicle 144 used to apply wait elements to yield scenarios, such as a classification (or type) of each actor (e.g., holonomic v. non-holonomic), its coordinates in a relevant phase space (e.g., position and velocity components), and/or other information used by the scenario analyzer 110 and/or the trajectory generator 106 to evaluate contention states of wait elements.

Contention state resolution may provide a contention state (which may also be referred to as a wait state or yield behavior) for each of the wait elements that apply to a yield scenario (e.g., one or more wait groups). A contention state of a wait element may represent an instruction corresponding to the manner in which the vehicle 140 should yield or proceed with right-of-way with respect to the wait element, as a matter of rule, expectation, formal or informal convention or norm (e.g., it may indicate what should happen according to convention whether it is actually happening or not).

The control planner 114 of the vehicle 140 is responsible for actually implementing yielding behavior from the yield behavior predictor 112, considering what should happen based on wait states, whether the vehicle 140 is in a position to stop and follow that instruction, whether other actors appear to be fulfilling their expected yielding duties, and take appropriate action. In at least one embodiment, the control planner 114 may determine trajectories and prune a possibility or search space of the trajectories based at least on wait conditions or states, such as based on determining the trajectories are incapable of complying with the wait states. For example, if a trajectory or path extends beyond a wait entry line when an active wait state includes "stop at entry," it may be pruned. Then the control planner 114 may select from the remaining options based on other criteria, such as comfort and obstacle avoidance. In at least one embodiment, trajectories may be generated by applying speed profiles to paths. The pruning may include pruning one or more speed profiles.

The control planner 114 may perform such operations as determining that even though a contention or wait state is "take (right-of-) way," another vehicle is not yielding (essentially detecting 'appropriate-to-honk') and decide to yield although that course of action may not be the prescribed course according to the yield behavior predictor 112. In addition, collision avoidance systems may always be running, so that regardless of the state of contention and even what the control planner 114 decides to do, collision avoidance may procedures may be deployed (e.g., if claimed sets are intersecting). The control planner 114 may implement yielding behavior by the yield behavior predictor 112 that analyzes all contentions in a wait group until they can be cleared jointly. In at least one embodiment, given a set of wait elements and resolved wait states, the control planner 114 may be configured to use the most restrictive wait state to define expected yielding behavior. For example, if one wait state is "take right-of-way" and another is "stop at entry," the control planner 114 may determine the vehicle 140 is to remain at the entry line.

Some non-limiting examples of wait states include: stop at entry, stop at entry then yield from entry, stop at entry then yield contention point, yield from entry, and yield from entry transient. Additional wait states include: stopped first has precedence, stop at entry then negotiate, negotiate, take right-of-way, take way transient, stop at entry, yield contention point, and yield contention point transient. In some embodiments, six of the above wait states may be considered as "primitive states," and the other wait states may be generated via one or more combinations of the six primitive states. The six primitive states may include: take right-of-way, stop at entry, yield from entry, yield contention point, transient, and negotiate.

Take right-of-way may represent a directive for the vehicle 140 to expect other actors to yield and may not impose any formal constraint from the contention (other than for the control planner 114 to watch other actors related to the contention and make sure they yield as expected).

Take way transient may signal that a wait state is about to change. In may indicate that take right-of-way still applies, but is likely to change soon to a more restrictive state. For example, a 'yellow' state of a traffic light may trigger take way transient.

Yield from entry may represent a directive that until such time that the contention is expected to be cleared, the vehicle 140 is to remain at the entry line. In this case, a pre-stop may not be mandated by rule, but the yield behavior predictor 112 should make sure that the contention is clear before the vehicle 140 passes the entry line, which often results in a pre-stop. Where the wait conditions in a wait are considered jointly, yield from entry may often mean that the yield behavior predictor 112 should be sure that all contentions in the wait group are clear before the vehicle 140 passes the entry line. In other words, if one contention/wait element has yield from entry, each may inherit that when analyzed by the yield behavior predictor 112, and if one has stop at entry, all wait elements may inherit the pre-stop.

Yield from entry transient may represent a transient version of yield from entry. It may indicate that yield from entry still applies, but is likely to change soon to a more restrictive state. Similarly, yield contention point transient may refer to a transient version of yield contention point.

Negotiate may represent that there is no known basis to determine right of way, such as for example for a highway merge where there is no cue from traffic rules, map statistics, geometry or size of the road (e.g., equally large highways merging and with similarly straight shapes).

The primitive stop at entry wait state may require the first vehicle 140 to stop at the entry wait line 132 of the intersection 130 and await further instructions. In contrast, the primitive yield contention (or yield contention point) wait state may indicate that a pre-stop is not mandated by a rule of the road (e.g., an uncontrolled intersection) and/or the first vehicle 140 is not legally obligated to stop and wait at the entry wait line 132 in order to clear the intersection 130. Rather, yield contention wait state may indicate that the first vehicle 140 should yield to contenders that may be in contention with the first vehicle (e.g., the second vehicle 142 and the third vehicle 144) and that the first vehicle 140 does not proceed in a manner that would "block" the intersection 130 while the other contenders are negotiating the intersection 130. For instance, under a yield contention wait state, the first vehicle 140 may proceed by pulling forward to initiate a left-hand turn, but slowly enough and with enough margin so that oncoming traffic (e.g., the third vehicle 144) understands that the first vehicle's 140 intention is to yield, and obviously not get in the way of the oncoming traffic. As an example of how non-primitive wait states (e.g., composite wait states) may be generated via combinations of primitive wait states, the stop at entry then yield contention wait state may include the behavior that the first vehicle follows the yields contention wait state behavior, while performing a pre-stop at the entry wait line 132. Examples include stop at entry then yield from entry, stop at entry then yield from entry transient, stop at entry then yield contention point, stop at entry then yield condition point transient, and stop at entry then negotiate.

Stopped first has precedence may represent that right-of-way (e.g., for a multi-way stop) is determined as a first-in-first-out queue where 'in' is defined as coming close to the intersection (likely in the corresponding contender area at the entry line pointing into the inside ground) as the first actor from that contender path, and stopping. This wait state may imply further processing of 'who-stopped-first' to actually resolve into a take right-of-way or yield from entry wait state per each actor associated with a contender path.

Figure 2:
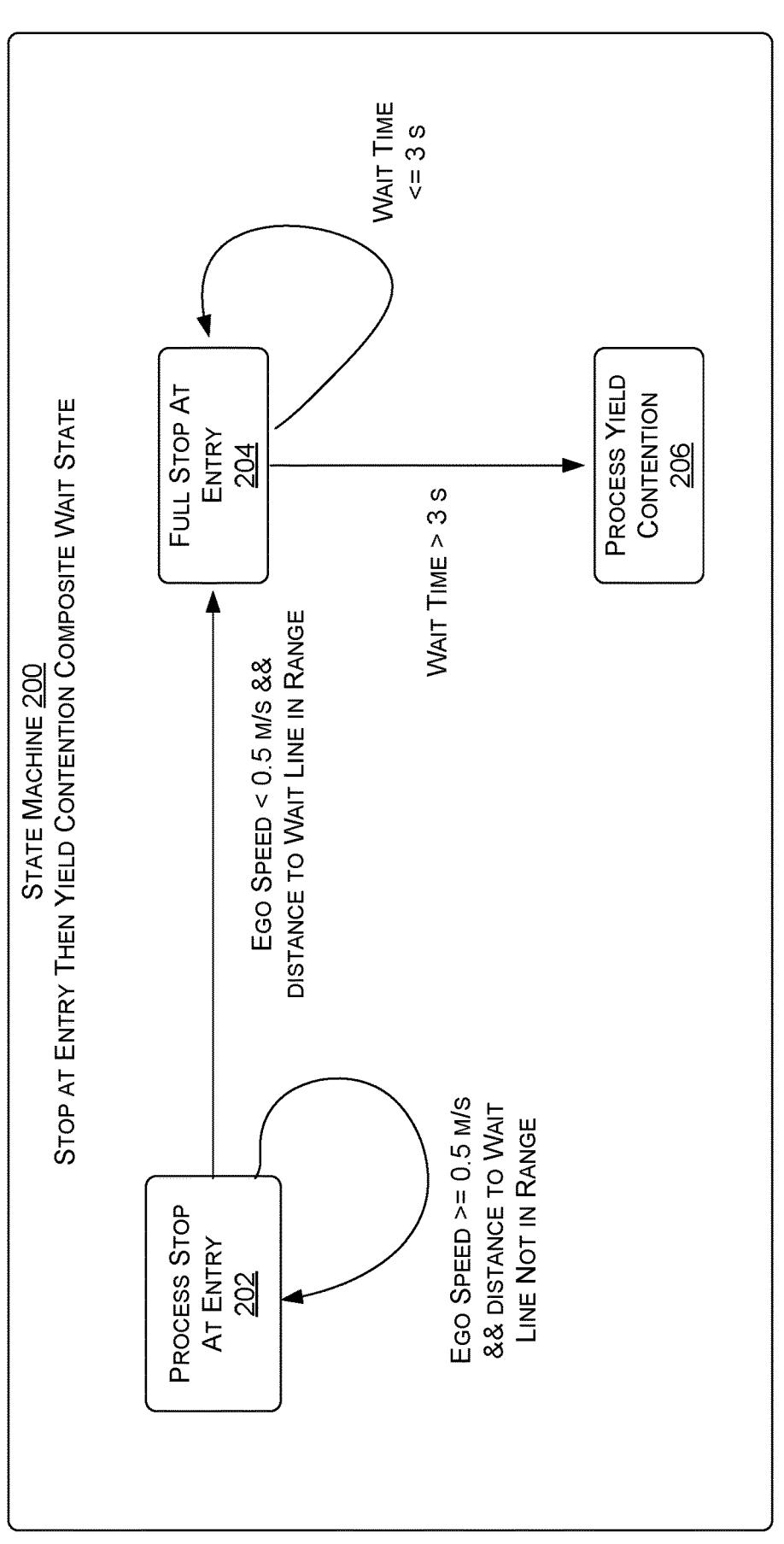
FIG. 2 is an example of a state machine, corresponding to a stop at entry then yield composite wait state, in accordance with some embodiments of the present disclosure.

At least a portion of the wait states may be modeled as state machines, or at least states within a state machine. For example, the composite wait states may be modeled as wait states composed of states corresponding to the wait states included in the composite wait state. With reference to FIG. 2, FIG. 2 is an example of a state machine 200, corresponding to a stop at entry then yield composite wait state. The state machine 200 is initiated at state 202, where the primitive wait state stop at entry is processed. The state machine 200 continues in the initial state 202, while the speed of the ego vehicle (e.g., the first vehicle 140 of FIG. 1) is less than 0.5 meters per second (m/s) and the distance to the wait line is not in range. When the transition condition is met (e.g., the ego speed is <0.5 meters per second and the distance to the wait line is in range) the state machine 200 transitions to state 204, where the ego vehicle is fully stopped at the entry to an intersection. When the ego vehicle has waited at least three seconds, the state machine 200 may transition to state 206. At state 206, the primitive wait state yield contention may be processed. Upon completion of the yield contention wait state, the state machine 200 may be exited.

Returning our attention to FIG. 1, the trajectory analysis performed by the trajectory generator 106 may generate the temporal evolution of the claimed sets, resulting in time-dependent trajectories for the first vehicle 140 and each of the contenders. As discussed below, the time-evolved trajectories are analyzed (by the scenario analyzer 110 and/or the scenario analyzer 110) for each actor to detect potential collisions (or "near" collisions) between the trajectories of the first vehicle 140 and the trajectories of the other actors. Such (near or explicit) collisions (or intersections) may indicate a potential collision between the first vehicle 140 and the other actor. Note here, the term intersection may refer to one or more spatial points that are included in at least two trajectories. The yield behavior predictor 112 determines a yield behavior (or wait state) for the first vehicle 140 that, if followed, will likely avoid potential collisions, via the trajectory analysis. For non-holonomic contenders, the yielding analysis may be a structured yielding analysis (e.g., because the non-holonomic contender may behave in a structured manner due to the reduction in the degrees of freedom (DOF)). For holonomic contenders, the yielding analysis may be an unstructured yielding analysis (e.g., because the holonomic contender may be behave in an unstructured manner due to the increase in degrees of freedom). When the possible future trajectories for holonomic contenders are constrained, or otherwise limited to a relatively small set of possible trajectories, the yielding analysis may revert to a structured yielding analysis.

Whether the analysis is structured or non-structured, the first vehicle's 140 possible trajectories (as well as the contenders' possible trajectories) are projected forward in time, and interference (e.g., intersections) between trajectories of separate actors are detected. Two non-limiting example types of interference patterns include crossings and merges. The crossings or merges may be analyzed by the scenario analyzer 110. A crossing interference pattern may arise if both the first vehicle 140 and the second vehicle 142 attempt to, simultaneously, go straight thru the intersection of the environment 126 according to the paths of a wait element. The trajectories of the two vehicles will intersect at one or more possible points along their trajectory, e.g., the two trajectories may intersect over a relatively small set of spatial points that are common to the respective trajectories, as the trajectories are evolved, and the two vehicles continue progressing in separate directions. In contrast, a merging intersection pattern may occur when two paths of a wait element there therefore the resultant trajectories intersect, and continue along in similar directions, such that the trajectories intersect over a much larger set of spatial points. For example, a merging interference pattern may arise when the first vehicle 140 attempts to go straight through the intersection, and the third vehicle 144 makes a right-hand turn through the intersection at approximately a similar point in time that the first vehicle 140 traverses the intersection. Merging interference patterns may additionally arise when one or more vehicles change lanes, navigates a freeway on-ramp such that a vehicle merges with pre-existing traffic on the freeway, and the like.

When "forward simulating" the possible trajectories (e.g., temporally-evolving) of a contender, the forward progress of the contender's trajectory may be unconstrained if the contender has a legal (or normative) right of way. The first vehicle's 140 trajectory may be evolved forward as moving aggressively as reasonably appropriate. For example, an "aggressive trajectory" may be projected to determine whether the first vehicle 140 may "clear" the intersection, well before the second vehicle 142 enters the intersection, such that any intersection pattern in the trajectories occurs over disparate temporal periods. If the "aggressive trajectory" does not result in clearing the intersection safely (and/or "politely"), then less aggressive trajectories may be considered, e.g., a trajectory that models the first vehicle 140 as slowing down, or even stopping at the intersection, may be employed to select the yield behavior for the first vehicle 140.

In some embodiments, the yielding analysis is performed in discrete "chunks." For example, each yield scenario is analyzed separately from each other yield scenario (e.g., successive intersections are analyzed separately and/or independently from each other). For example, successive intersections may be analyzed serially in a first-in first-out (FIFO) fashion. In the case of an intersection (such as but not limited to the one illustrated in environment 126), at least two possible yield behaviors may be analyzed. The first considered yield behavior may be a more aggressive yield behavior that includes the first vehicle 140 navigating the intersection with a positive (but reasonable) acceleration. The second yield behavior may be a more conservative yield behavior that includes the first vehicle 140 employing a negative acceleration (e.g., braking) to stop short of the intersection. Various strategies between these bimodal behaviors (e.g., the most aggressive yield strategy or most conservative yield strategy) may be considered in the various embodiments.

In one or more embodiments, each contender or contender path of a wait element may be considered separately. In some embodiments, the contenders or contender paths are analyzed, via parallel-computing methods. In other embodiments, the contenders or contender paths are analyzed serially, via the above mentioned FIFO analysis stack or queue. For example, the contender that is the earliest arrival to the intersection may be analyzed prior to the other contenders. The yielding analysis may be sufficiently forward in time, such that the first vehicle 140 will not "block the intersection." That is, in accordance with the yield behavior, either the first vehicle 140 may safely clear the intersection, or the first vehicle 140 may stop (or slows down) prior to entering the intersection, e.g., the first vehicle does not stop or brake in the middle of the intersection.

In addition to detecting the "beginning" of a yield scenario, embodiments may detect an "ending of the yield scenario." For crossing interference patterns, the end of a yield scenario may be signaled by the first vehicle 140 successfully clearing the set of crossing points of the trajectories and/or contentions of one or more associated wait elements. For merging paths, the issue may be more intricate. For merging interference patterns, a yield scenario may be terminated when each of the associated actors have reached an equilibrium state (e.g., each of the actors have transitioned to a reasonable speed, considering the speed of the surrounding traffic, and each of the actors are spaced at a distance from the other actors that provides a reasonable level of safety.)

The functionality of the yield planner system 100 will now be discussed in a more detailed manner. Much of the following discussion is directed towards structured yielding analysis in an intersection yielding scenario that involves crossing interference patterns. However, the embodiments are not so limited, and it should be understood that such methods may be extended to include merging crossing patterns and/or holonomic contenders. It is also understood that the encoding of the yield scenario and detection of each of the actors' positions in a relevant phase space for the scenario may be performed by other systems associated with the first vehicle 140. Such information may be provided to the yield planner system 100 as inputs.

The yield behavior predictor 112 may analyze relationships in the longitudinal (e.g., across a temporal dimension) evolution of each actor's potential trajectories across a detected yield scenario, e.g., the yield planner may perform time-forward trajectory simulations and tests for intersections of claimed sets. The yield planner system 100 may model the environment 126 as a three-dimensional manifold (e.g., a top down view with two spatial dimensions with coordinates (x, y) and a temporal dimension with coordinate (t)). At each time t, the actors' claimed sets may be considered. Also at each t, the claimed sets may be projected forward in time. Accordingly, the trajectories may be modeled to occur on a 4D locally-flat manifold (two spatial dimensions and two temporal dimensions). The second temporal dimension may be referenced by the coordinate z. Even though the two temporal dimensions may be related via an affine transform, the two temporal dimensions may be kept separate in the analysis to simplify projecting the trajectories. Thus, at each moment in time (t), each trajectory may be described by three coordinates (x, y, z), where x and y refer to spatial coordinates and z refers to a (forward-looking) time coordinate.

In performing the yield analysis, the yield behavior predictor 112 may employ the following simplifying assumptions. Firstly, the first vehicle's 140 control system provides the yield planner system 100 the first vehicle's 140 planned and/or desired path embedded in the 4D manifold. Secondly, the control system is enabled to provide the yield planner system 100 close to complete information regarding each contender. That is, the yield planner system 100 can rely on receiving each contender's current position in phase space (e.g., both location and velocity), as well as a classification of each contender (e.g., holonomic v non-holonomic) and at least an estimated shape and/or size (e.g., to generate a bounding box on the 2D spatial manifold (e.g., the spatial sub-manifold of the 4D space-time manifold) to model the physical extensions of the contender). It may also be assumed that, for each actor, the yield planner system 100 is provided a discrete finite set of their possible intended paths. In practice, this may be handled, for example, by having a lane graph of the intersection or other yield area, including cross traffic paths, given by a map, and attached to perceived actors to those paths. In this way, possible options (e.g., multiple trajectories) may be generated for each actor using corresponding wait elements that capture possible paths. Furthermore, each path of each contender may be considered separately be providing a corresponding wait element. This may simplify the analysis, such that only a set of two-body interactions need to be considered (e.g., interference patterns between the first vehicle's 140 trajectory and a trajectory of a contender) when determining if a particular contention/wait element is clear. That is, three or a greater number of body interactions need not be considered in the same analysis in some embodiments.

Any potential interference between the trajectories of the first vehicle 140 and a contender (e.g., second vehicle 142 and/or third vehicle 144) may be based on an approximation of the rules or heuristics associated with navigating roadways. In particular, when considering a particular pairing of the first vehicle's 140 phase space coordinates (e.g., the position and velocity coordinates along the first vehicle's current trajectory) and a contender's state (e.g., the position and velocity coordinates along the contender's trajectory), it may be determined whether the trajectories cross or merge. Here, an actor's claimed set may refer to the set of points in space that will be occupied by the actor's shape at some time if the actor starts braking now with some constant safety braking deceleration. This scenario may be approximated by analyzing progress along the trajectories, and also only considering claimed sets as progress along trajectories, while adding spatial padding for width of actors to determine if an interference is likely to occur.

The analysis may be subdivided into multiple stages. In a first stage, interference pairings between points on the paths in terms of crossings (e.g., represented as path interval pairs of a wait element that are determined to interfere as a whole) and merges (e.g., represented as path interval pairs of a wait element that are determined to be the same, corresponding 1:1 point per point) may be identified and/or determined. A second stage may consider how the actors and their claimed sets progress along their individual paths.

When determining whether an interference occurs, each of the actors may be physically modeled as a polygon positioned on the 2D spatial manifold and centered on the trajectory. That is, the spatial boundaries of each actor may be modeled with a bounding box or shape that includes a polygonal footprint (although other shapes could be used). Thus, for each considered trajectory, a set of polygons may be centered along the trajectory, where the polygon extends beyond the trajectory to approximate the spatial boundaries of the actor and extend along the tangential direction of the trajectory as the actor evolves in time. The progress along the first vehicle's 140 trajectory may be considered separately from the progress along the contender's trajectory. The set of potential interference points may be defined as a set of points that are included in both of at least one of the first vehicle's 140 possible polygons and at least one of the contender's possible polygons, e.g., the intersection of the polygons. From this set of potential interference points, a set of states along the first vehicle's trajectory and a set of states along the contender's trajectory may be determined. The set of states may be indicative of a physical contention. The time that each actor enters the interference region may be determined from the set of states on both paths.

A first width and a first length may be assumed for the first vehicle's 140 polygonal bounding box. Separate widths and lengths may be assumed for the polygonal bounding box for each contender corresponding to real-world dimensions of those actors. The yield behavior predictor 112 may construct a first line of the first width, which may be substantially perpendicular to the first vehicle's 140 trajectory that is swept along the first vehicle's 140 trajectory. The yield behavior predictor 112 may also determine if the generated first line intersects a similarly generated line for the contender's assumed width. The contender's line may be substantially perpendicular to the contender's trajectory, and swept along the contender's trajectory. The yield behavior predictor 112 may determine whether the two lines intersect with each other. If an intersection occurs, a potential interference may be assumed. In some embodiments, this analysis may be approximated by employing a circle (rather than a polygon) with diameter equal to the first width along the first vehicle's 140 trajectory. The circle may be centered on the first vehicle's 140 trajectory and swept along the trajectory as the first vehicle 140 is simulated forward in time. Points on the contender trajectory that are included in at least one of the circles may be identified.

Similarly, a sweeping circle may be generated for each contender, along their respective trajectories, and all potential interference points may be identified. This may be accomplished, for example, via nested closed loops. The yield behavior predictor 112 may subtract half the length of the first vehicle's 140 bounding box (e.g., whether the bounding box or shape is a polygon or a circle) to determine a point of entry and point of exit for the interval of poses where the first vehicle's 140 bounding box touches the interference zone. Merging interference patterns may be similarly analyzed by finding extended intervals that overlap, or be given directly from the lane graph.

When forward-projecting a trajectory, the distance traveled by a vehicle (e.g., the first vehicle 140) may be indicated as the function d(t) and the velocity may be indicated as the function v(t). Thus, a temporal evolution of a trajectory through a vehicle's phase-space may be indicated via the 2D point (d(t), v(t)). It may be assumed that an actor accelerates by some constant amount a (which can depend on actor class or whether the actor is going ahead aggressively or yielding, or be zero if so desired) until reaching some maximum velocity (such as the speed limit) or minimum velocity (such as stopping). A computation may be performed and one or more arrays may be computed (e.g., for d(t) and v(t)) during a separate routine.

Given a vehicle's phase-space trajectories, the claimed sets may be considered at each time and whether they interfere at crossing or merges. The claimed set corresponding to the state (d(t), v(t)) may be modeled as decelerating by the fixed amount b (which may depend on actor class) until stopped. The deceleration may take the form $$z(t) = \frac{v(t)}{b},$$

and follow the velocity profile v(t)−bz (note that the second temporal coordinate is denoted by z to not confuse it with t, and there is an isomorphism between z and t). The stopping distance $$\frac{v(t)^2}{2b}$$

may be added to d(t). Thus, the claimed set curve (as a function of t and z) may be calculated as:

$$D(t, z) = d(t) + v(t) \cdot z - \frac{1}{2} \cdot b \cdot z^2$$

over the interval $z \in [0, v(t)b]$ and then stop at its maximum value of:

$$d(t) + \frac{1}{2} \cdot \frac{v(t)^2}{b}.$$

Given the modeling of the various trajectories, the scenario analyzer 110 may analyze the intersection (or crossing) as follows. For a crossing, each claimed set may be analyzed by determining the time that the claimed set enters the intersection 130 (e.g., $Z_{in}(t, D_{in})$) and the time that the claimed set leaves the intersection (e.g., $Z_{out}(t, D_{out})$), where $D_{in}$ may denote the distance along the path at which the bounding box of the actor enters the crossing interval 132 and $D_{out}$ denotes the distance along the path at which the bounding box of the actor leaves the crossing interval 134 (e.g., in a case where the first vehicle 140 is going straight through the intersection 130. The entrance and exit times may be computed as follows:

$$z_{in}(t, D_{in}) = \max\left(0, \frac{1}{b}\left[v(t) - \sqrt{v(t)^2 + 2b(d(t) - D_{in})}\right]\right)$$

$$z_{out}(t, D_{out}) = \max\left(0, \frac{1}{b}\left[v(t) - \sqrt{v(t)^2 + 2b(d(t) - D_{out})}\right]\right).$$

When the above calculated values are real, the values may be employed to identify potential collisions in pairs of claimed sets, as discussed herein. If the value calculated for $Z_{in}(t, D_{in})$ is complex, then the claimed set may not enter the crossing for this selection of t (and thus no potential collision). If the value calculated for $Z_{out}(t, D_{out})$ is complex, then the claimed set may not leave the crossing for this selection of t. The use of the max function clamps negative values to zero, since time-inversion symmetries are not contemplated in at least some embodiments. The time interval $[Z_{in}(t, D_{in}), Z_{out}(t, D_{out})]$ may be calculated for each claimed path, and for each claimed path, an appropriate discretized set of t may be considered. The temporal interval $[Z_{in}(t, D_{in}), Z_{out}(t, D_{out})]$, for the specific time bin t, may be referred to as a z-interval for that time bin. A z-interval for the ego-vehicle may be calculated, as well as a z-interval for the contender path. The z-interval may indicate the time period (according to the second temporal coordinate z, and for a particular value of the first temporal coordinate t), that the actor is within the intersection. If the intersection of z-intervals for two claimed paths (e.g., the ego-vehicle's claimed path and the contender's claimed path) is a non-null set, then the claimed paths may be associated with a potential collision. In such instances, a determined yield condition may include a significant braking behavior to leave a good margin between the first vehicle's 140 stopping point for the crossing and/or a wait element may be determined as not cleared. If no overlap exists, the first vehicle 140 may proceed accordingly and/or a wait element may be determined as cleared.

The scenario analyzer 110 may employ a separate method to determine whether pairs of claimed sets indicated a potential collision for merging yielding scenarios. For merging yield scenarios, the scenario analyzer 110 may assume a distance to a merge point along the first vehicle's 140 claimed path (e.g., $D_{e\_in}$). Additionally, a distance to the merge point for a contender's claimed path (e.g., $D_{c\_in}$) may be assumed. After the merge point, the claimed paths may be assumed to coincide. The scenario analyzer 110 may determine, whether if for any z, the interval is between the below function (e.g., a function of a non-negative value of z for a fixed value of t):

$$D_e(t, z) - D_{e\_in} = \begin{cases} d_e(t) - D_{e\_in} + v_e(t) \cdot z - \dfrac{b_e z^2}{2}, & 0 \le z \le \dfrac{v_e(t)}{b_e} \\ d_e - D_{e\_in} + \dfrac{v_e(t)^2}{2 \cdot b_e}, & \dfrac{v_e(t)}{b_e} \le z \end{cases},$$

which describes how far the front of the first vehicle's 140 claimed set has passed the merge point (note that it is a quadratic followed by a constant) and the vehicle length backwards (e.g., the interval may be described by the function above and the same function minus the vehicle length), is ever hit for a non-negative range value of the function:

$$D_c(t, z) - D_{c\_in} = \begin{cases} d_c(t) - D_{c\_in} + v_c(t) \cdot z - \dfrac{b_c z^2}{2}, & 0 \le z \le \dfrac{v_c(t)}{b_c} \\ d_c - D_{c\_in} + \dfrac{v_c(t)^2}{2 \cdot b_c}, & \dfrac{v_c(t)}{b_c} \le z \end{cases},$$

which describes how far the front of the claimed set of the contender has passed the merge point. Note that the subscripts e refer to the first vehicle 140 (e.g., the ego-vehicle) and the subscripts c refer to a contender in the merging yield scenario. This checks if the claimed sets intersect after the merge point. This can be determined by solving a number of quadratics (solving for intersections between ego-front and contender front and ego-back and contender front, which if done brute force requires solving 2×4=8 quadratics and reasoning about the intersection points) and taking care to handle all cases (ego vehicle claimed set front and back reaches past the merge point, only front reaches the merge point, or none reaches the merge point, and contender front reaches the merge point or not).

Now referring to FIGS. 3-7, each block of methods 300-700, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 300-700 are described, by way of example, with respect to the yield planer system of FIG. 1. However, these methods may additionally or alternatively be executed by any one system, or any combination of systems, including, but not limited to, those described herein.

FIG. 3 is a flow diagram showing a method 300 for controlling an autonomous vehicle (e.g., an ego vehicle), in accordance with some embodiments of the present disclosure. The method 300, at block 302, includes detecting a yield scenario for the ego-vehicle. At block 304, one or more wait elements encoding various aspects of the yield scenario are received. The one or more wait elements may be received in response to detecting the yield scenario. The one or more wait elements may encode one or more contenders relevant to the yield scenario. For each contender, the wait element may encode one or more claimed paths for each indicated contender. The wait element may additionally encode at least one claimed path for the ego-vehicle. At block 306, one or more crossings (e.g., a crossing at an intersection) and/or mergings (e.g., a lane merging), which are relevant to the yield scenario, are identified via an analysis of the data encoded in the received wait elements. Various embodiments of identifying crossings and/or mergings are discussed in conjunction with method 400 of FIG. 4.

At block 308, trajectories are generated for the crossings and mergings identified in block 306 (e.g., from a wait element(s) paths). Various embodiments of generating trajectories are discussed in conjunction with method 500 of FIG. 5. At block 310, trajectories associated with crossings are analyzed to determine whether a potential collision between the ego-vehicle and one or more contenders are to be avoided in a crossings (or intersection) yield scenario. Various embodiments of analyzing crossing-related trajectories are discussed in conjunction with method 600 of FIG. 6. Also at block 310, trajectories associated with mergings are analyzed to determine whether a potential collision between the ego-vehicle and one or more contenders are to be avoided in a merging yield scenario. Various embodiments of analyzing crossing-related trajectories are discussed in conjunction with methods 600 and 700 of FIG. 6 and FIG. 7 respectively. However, briefly here, employing trajectories to analyze crossings and mergings may include evaluating whether there is a conflict between the trajectory of the ego-vehicle and one or more trajectories of the one or more contenders (e.g., evaluating whether there is a conflict between a first trajectory (of the ego-vehicle) and a second trajectory (of a contender)). At block 312, a yield behavior is selected based on the analyses of the crossing and merging trajectories. At block 314, the ego-vehicle is controlled, such that the ego-vehicle operates with accordance to the yield behavior selected at block 312.

Figure 4:
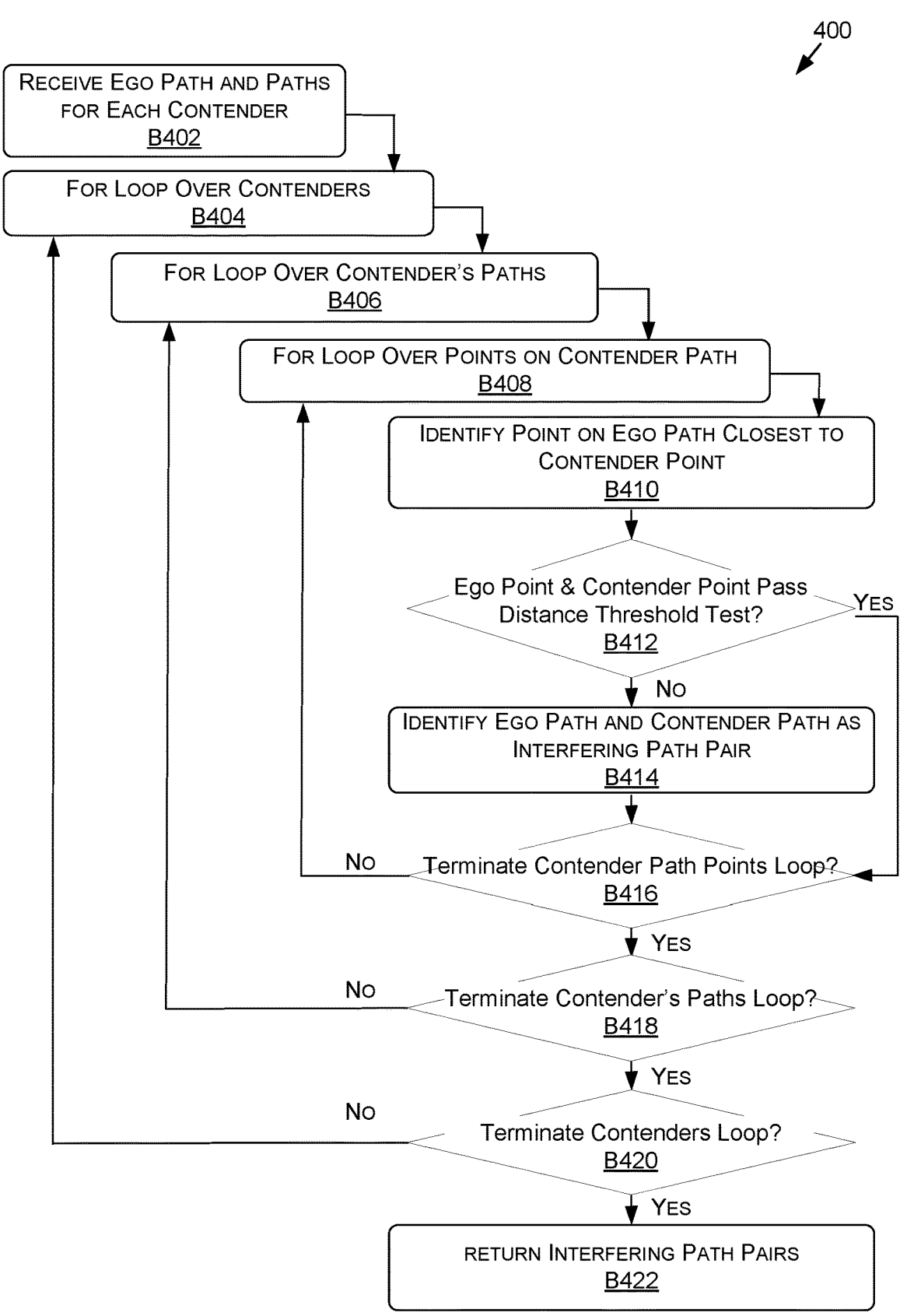
FIG. 4 is a flow diagram showing a method for identifying crossings and merges for claimed paths for a yield scenario, in accordance with some embodiments of the present disclosure.

FIG. 4 is a flow diagram showing a method 400 for identifying crossings and merges for claimed paths for a yield scenario, in accordance with some embodiments of the present disclosure. In some embodiments, the method 400 may be called by the method 300 of FIG. 3. For example, the method 400 may be called from block 306 of the method 300. The method 400, at block 402, includes receiving a set of claimed paths for the ego-vehicle. Also at block 402, a set of claimed paths may be received for each of the contenders relevant to a yield scenario (e.g., the yield scenario detected in block 302 of the method 300). For example, the various sets of the claimed paths may be encoded in the one or more wait elements received in block 304 of the method 300. In at least one embodiment, the set of claimed paths for the ego-vehicle may include a single ego-vehicle claimed path and the set of the claimed paths for each contender may include one or more claimed paths. At block 404, a "for" loop is initiated over the one or more contenders that are relevant to the yield scenario. In various embodiments, rather than a for loop, a "while" loop, or any other such programmatic, repeating, or iterative, looping structures may be initiated in any of the methods discussed herein.

At block 406, a for loop over the set of the claimed paths for the current contender (of the contender for loop initiated at block 404) is initiated. At block 408, a for loop is initiated over the discretized claimed points in the current contender path (of the contender path loop). At block 410, a point on the ego-vehicle's claimed path that is closest (e.g., according to an L2 norm for a Euclidean 2D manifold) to the current point (of the path point for loop initiated at block 408) is identified. At decision block 412, the distance (e.g., an L2 distance) between the contender path point and the ego-vehicle path point (e.g., the point identified in block 410) is subject to a distance threshold test. In some embodiments, if the distance is greater than the max(ego-width, contender-width), where ego-width indicates the modeled width of the ego-vehicle and the modeled width of the contender, then there is no crossing or merging for the contender point and the ego-vehicle path, and method 400 may proceed to decision block 416.

If the distance is less than the max (ego-width, contender-width), then there may be a crossing or merging for the contender point and the ego-vehicle path, and the method 400 may proceed to decision block 414. Note that the modeled width of the ego-vehicle and the contenders may be determined using perception components of the ego-vehicle. At block 414, the ego-vehicle path and the contender path may be identified as an interfering path pair. The path pair may be identified as a crossing or a merging interference path pair. In some embodiments, the relevant pair of points (e.g., the ego-vehicle path point and the contender path point) may be identified as an interfering point pair (e.g., a crossing or merging interference point pair). The method 400 may flow to decision block 416.

At decision block 416, it is determined whether to terminate the contender path points for loop. If the contender point's for loop is to be terminated, then the method 400 flows to decision block 418. Otherwise, if the contender's point flow loop is to be continued, then the method 400 returns to block 408. At decision block 418, it is determined whether to terminate the contender's paths for loop. If the contender's path for loop is to be terminated, then method 400 flows to decision block 420. If the contender's path for loop is to be continued, then method 400 returns to block 406. At decision block 420, it is determined whether to terminate the for loop over the contenders. If the for loop over the contenders is to be terminated, the method 400 flows to block 422. If the for loop over the contenders is to be terminated, then the method 400 returns to block 404. At block 422, the interfering path pairs (and the interfering point pairs) may be returned. For example, the interfering path pairs may be returned as crossings and merges to block 308 of the method 300.

Figure 5:
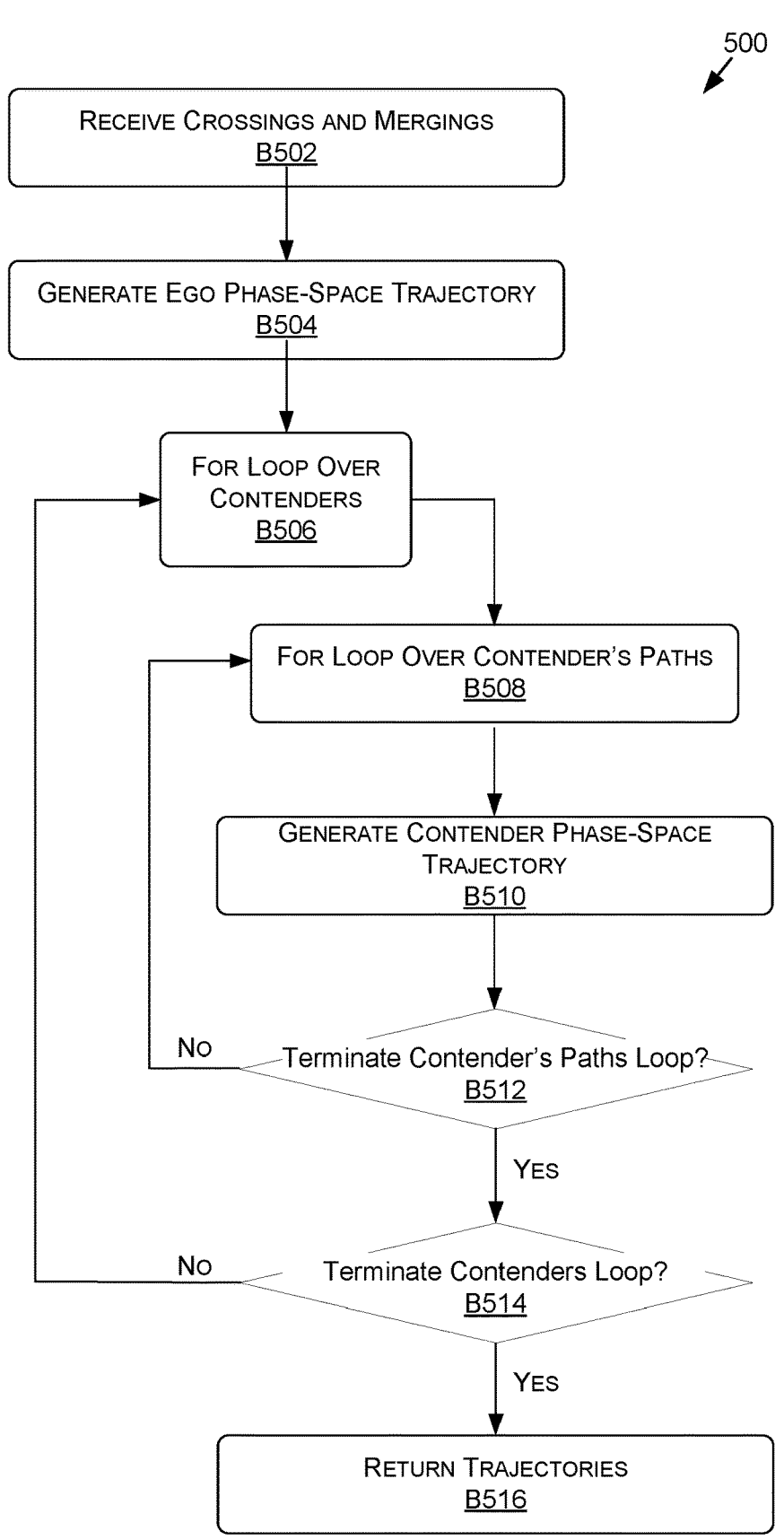
FIG. 5 is a flow diagram showing a method for generating trajectories for crossings and merges for a yield scenario, in accordance with some embodiments of the present disclosure.

FIG. 5 is a flow diagram showing a method 500 for generating trajectories for crossings and merges for a yield scenario, in accordance with some embodiments of the present disclosure. In some embodiments, the method 500 may be called by the method 300 of FIG. 3. For example, the method 500 may be called from block 308 of the method 300. The method 500, at block 502, includes receiving the crossings and mergings. Receiving the crossings and mergings may include receiving the interfering path pairs from the method 400 (e.g., block 422). At block 504, a trajectory for the ego-vehicle may be generated. The ego-vehicle's trajectory may be through a velocity-distance phase-space, and may include determining $(d_e(t), v_e(t))$ as described herein.

At block 506, a for loop is initiated over the contenders. The for loop initiated at block 506 may be limited to contenders that are involved with at least one interference (e.g., a crossing or a merging) with the ego-vehicle path. At block 508, a for loop is initiated over the claimed path of the current contender (e.g., with respect to the for loop of block 506). In some embodiments, the for loop may be limited to the claimed paths that have an interference with the ego-vehicle path. At block 510, a trajectory for the current contender path (e.g., with respect to the for loop of block 508) is generated. The contender path's trajectory may be through a velocity-distance phase-space, and may include determining $(d_c(t), v_c(t))$ as described herein.

At decision block 512, it is determined whether to terminate the contender's path loop. If the loop is to be terminated, the method 500 flows to decision block 514. If the for loop is to be continued, the methods 500 may return to block 508. At decision block 514, it is determined whether to terminate the contenders for loop. If the for loop is to be terminated, the method 500 may flow to block 516. If the for loop is to be continued, then the method 500 may return to block 506. At block 516, the ego-vehicle trajectory and the contenders' trajectories are returned. For example, the trajectories may be returned as crossing and merge trajectories to block 310 of the method 300.

Figure 6:
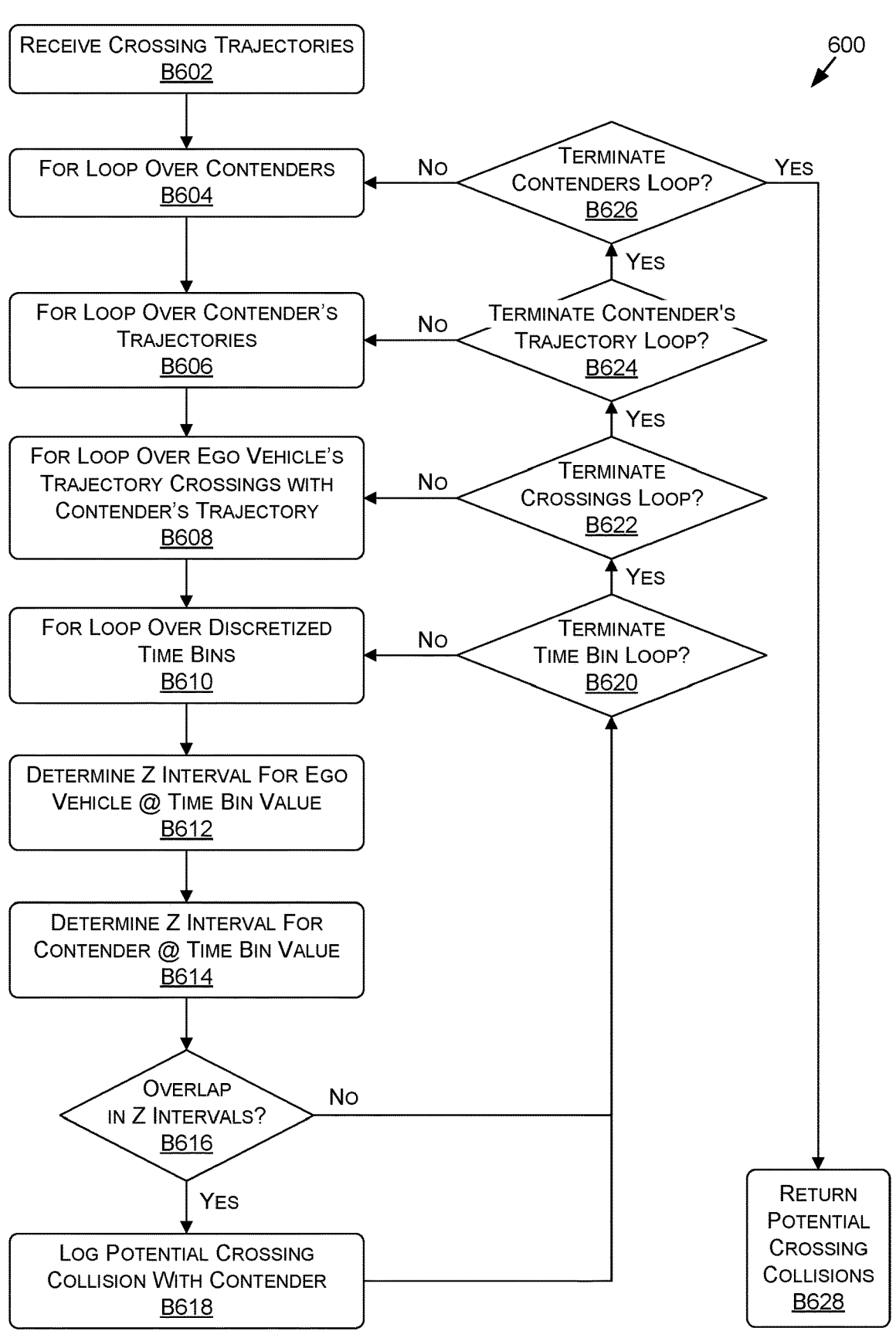
FIG. 6 is a flow diagram showing a method for analyzing crossing trajectories for a yield scenario, in accordance with some embodiments of the present disclosure.

FIG. 6 is a flow diagram showing a method 600 for analyzing crossing trajectories for a yield scenario, in accordance with some embodiments of the present disclosure. In some embodiments, the method 600 may be called by the method 300 of FIG. 3. For example, the method 600 may be called from block 310 of the method 300. The method 600, at block 602, includes receiving crossing-related trajectories. The crossing-related trajectories may be returned from block 516 of the method 500. The crossing-related trajectories may include at least one ego-vehicle trajectory and one or more trajectories from one or more contenders. Each of the one or more contender trajectories may have one or more points that are associated with one or more crossing interferences with one or more points of the ego-vehicle trajectory. At block 604, a for loop over the one or more contenders is initiated. At block 608, a for loop over the current contender's trajectories is initiated. The for loop of block 608 may be limited to the current contender's trajectories that have at least one crossing interference with the ego-vehicle trajectory. At block 610, a for loop over the discretized time bins of the current contender trajectory is initiated.

At block 612, the z-interval for the ego-vehicle (for the current t bin value) is calculated as described herein, e.g., $[Z_{in}(t, D_{in}), Z_{out}(t, D_{out})]$. Note that the interval calculated at block 612 are the z-intervals calculated by the scenario analyzer 110 of FIG. 1. At block 614, the z-interval for the current contender path (and for the current t bin value) is calculated. At decision block 616, it is determined whether there is an overlap between the z-interval for the ego-vehicle path and the contender path. If the overlap is the null set, then the method 600 may flow to decision block 620. If the overlap of the two z-intervals is a non-null set, then the method 600 may flow to block 618. At block 618, a potential crossing collision may be logged or stored for the pair of trajectories at the particular t bin value. The method 600 may then proceed to decision block 620.

At decision block 620, it is determined whether to terminate the for loop over the t bin values. If the loop is to be terminated, then the method 600 flows to block 622. If the loop is not to be terminated, then the method 600 returns to block 610. At decision block 622, it is determined whether to terminate the loop over the trajectory's crossing interferences. If the loop is to be terminated, the method 600 may proceed to decision block 624. If the loop is not terminated, then the method 600 returns to block 608. At decision block 624, it is determined whether to terminate the loop under the current contender's trajectories. If the loop is to be terminated, the method 600 flows to decision block 626. If the loop is not to be terminated, then the method 600 returns to block 606. At decision block 626, it is determined whether to terminate the loop over the contenders. If the loop is to be terminated, then the method 600 may flow to block 628. If the loop is not to be terminated, then the method 600 may return to block 604. At block 628, the potential crossing collisions are returned (e.g., those interferences where the contender trajectory and the ego-vehicle trajectory have overlapping z-intervals for at least one particular value of the time bin). The potential crossing collisions may be returned to block 312 of the method 300.

Figure 7:
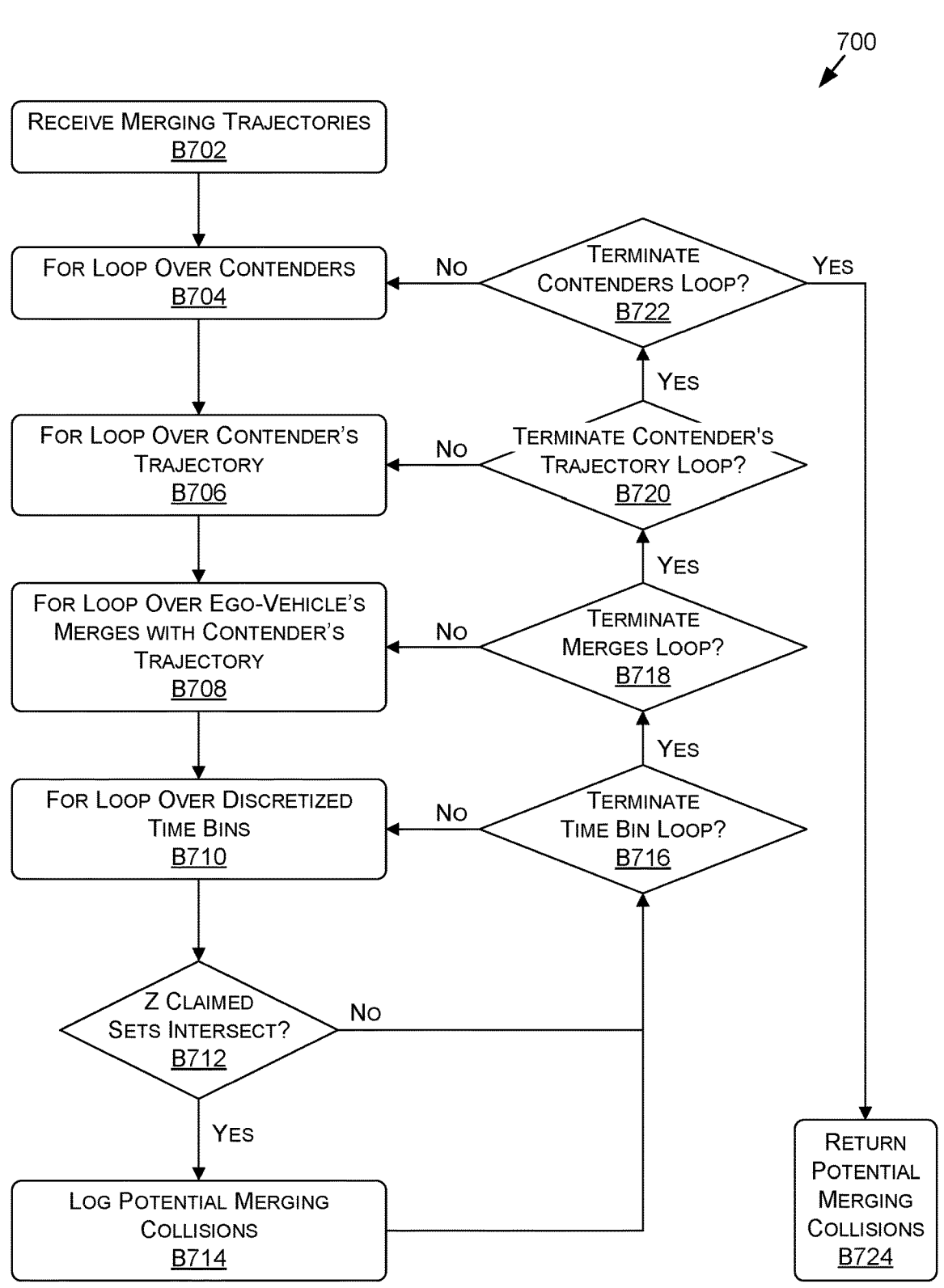
FIG. 7 is a flow diagram showing a method for analyzing merging trajectories for a yield scenario, in accordance with some embodiments of the present disclosure.

FIG. 7 is a flow diagram showing a method 700 for analyzing merging trajectories for a yield scenario, in accordance with some embodiments of the present disclosure. In some embodiments, the method 700 may be called by the method 300 of FIG. 3. For example, the method 700 may be called from block 310 of the method 300. The method 700, at block 702, includes receiving merging-related trajectories. The merging-related trajectories, or merging trajectories, may be returned from block 516 of the method 500. The merging trajectories may include at least one ego-vehicle trajectory and one or more trajectories from one or more contenders. Each of the one or more contender trajectories may have one or more points that are associated with one or more merging interferences with one or more points of the ego-vehicle trajectory. At block 704, a for loop over the one or more contenders is initiated. At block 708, a for loop over the current contender's trajectories is initiated. The for loop of block 708 may be limited to the current contender's trajectories that have at least one merging interference with the ego-vehicle trajectory. At block 710, a for loop over the discretized time bins of the current contender trajectory is initiated.

At decision block 712, it is determined if the z claimed sets intersect. Note, the z claimed sets are those calculated by the scenario analyzer 110 of FIG. 1. Thus, the z-intervals include the determination of $(D_e(t, z)-D_{e\_in})$ (for the ego-vehicle trajectory) and $(D_c(t, z)-D_{c\_in})$ (for the contender trajectory), as described above. If there is no intersection, then the method 700 may flow to decision block 716. If there is an intersection, then the method 700 may flow to block 712. At block 714, a potential merging collision may be logged or stored for the pair of trajectories at the particular t bin value. The method 700 may then proceed to decision block 716.

At decision block 716, it is determined whether to terminate the for loop over the t bin values. If the loop is to be terminated, then the method 700 flows to decision block 718. If the loop is not to be terminated, then the method 700 returns to block 710. At decision block 718, it is determined whether to terminate the loop over the trajectory's merging interferences. If the loop is to be terminated, the method 700 may proceed to decision block 720. If the loop is not terminated, then the method 700 returns to block 708. At decision block 720, it is determined whether to terminate the loop under the current contender's trajectories. If the loop is to be terminated, the method 700 flows to decision block 722. If the loop is not to be terminated, then the method 700 returns to block 706. At decision block 722, it is determined whether to terminate the loop over the contenders. If the loop is to be terminated, then the method 700 may flow to block 724. If the loop is not to be terminated, then the method 700 may return to block 704. At block 724, the potential merging collisions are returned (e.g., those interferences where the contender trajectory and the ego-vehicle trajectory have intersecting z claimed sets for at least one particular value of the time bin). The potential crossing collisions may be returned to block 312 of the method 300.

Example Autonomous Vehicle

Figure 8A:
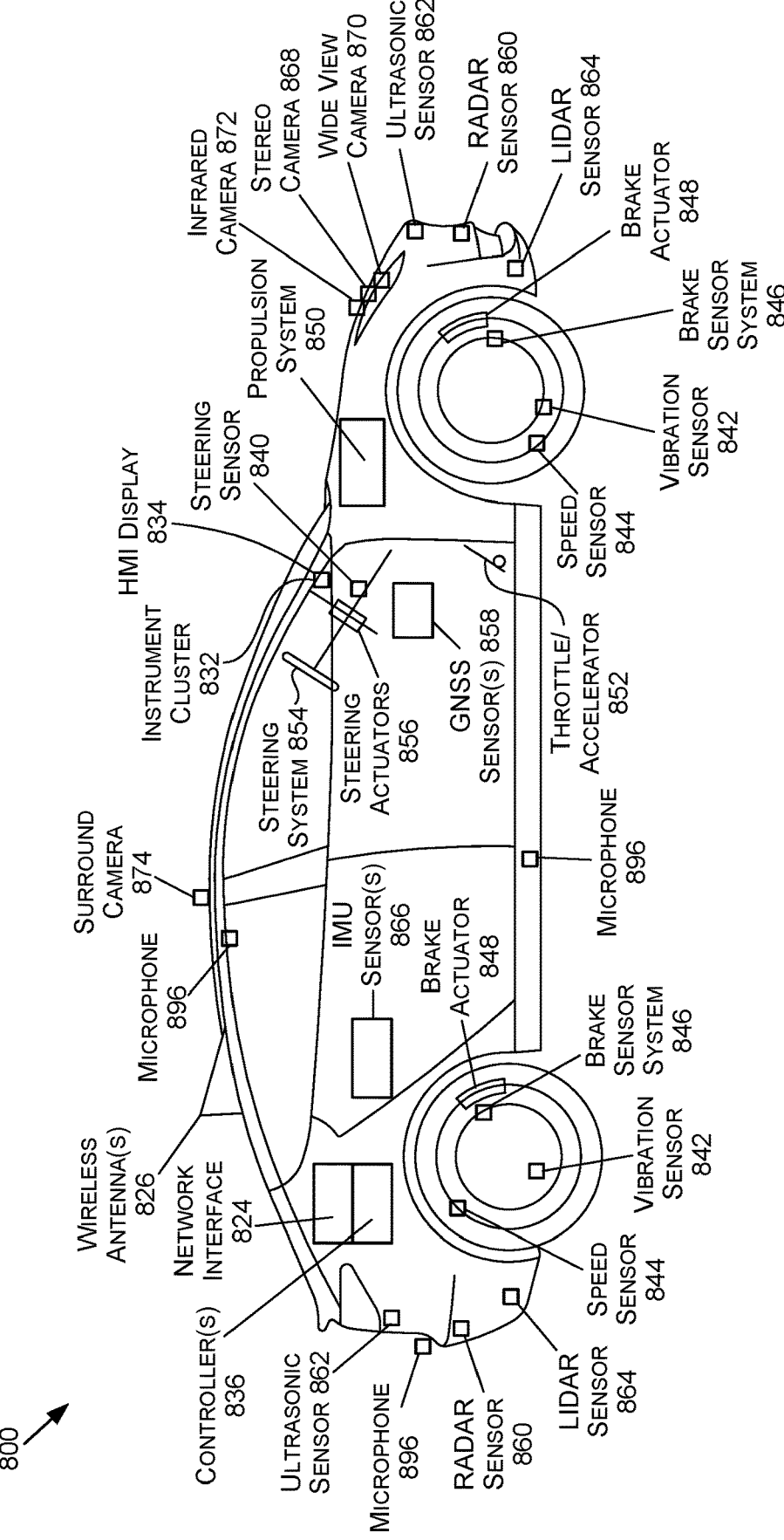
FIG. 8A is an illustration of an example autonomous vehicle, in accordance with some embodiments of the present disclosure.

FIG. 8A is an illustration of an example autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. For example, the vehicle 800 may be capable of conditional automation (Level 3), high automation (Level 4), and/or full automation (Level 5), depending on the embodiment.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the HD map 822 of FIG. 8C), location data (e.g., the vehicle's 800 location, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 800 further includes a network interface 824 which may use one or more wireless antenna(s) 826 and/or modem(s) to communicate over one or more networks. For example, the network interface 824 may be capable of communication over LTE, WCDMA, UMTS, GSM, CDMA2000, etc. The wireless antenna(s) 826 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 8B:
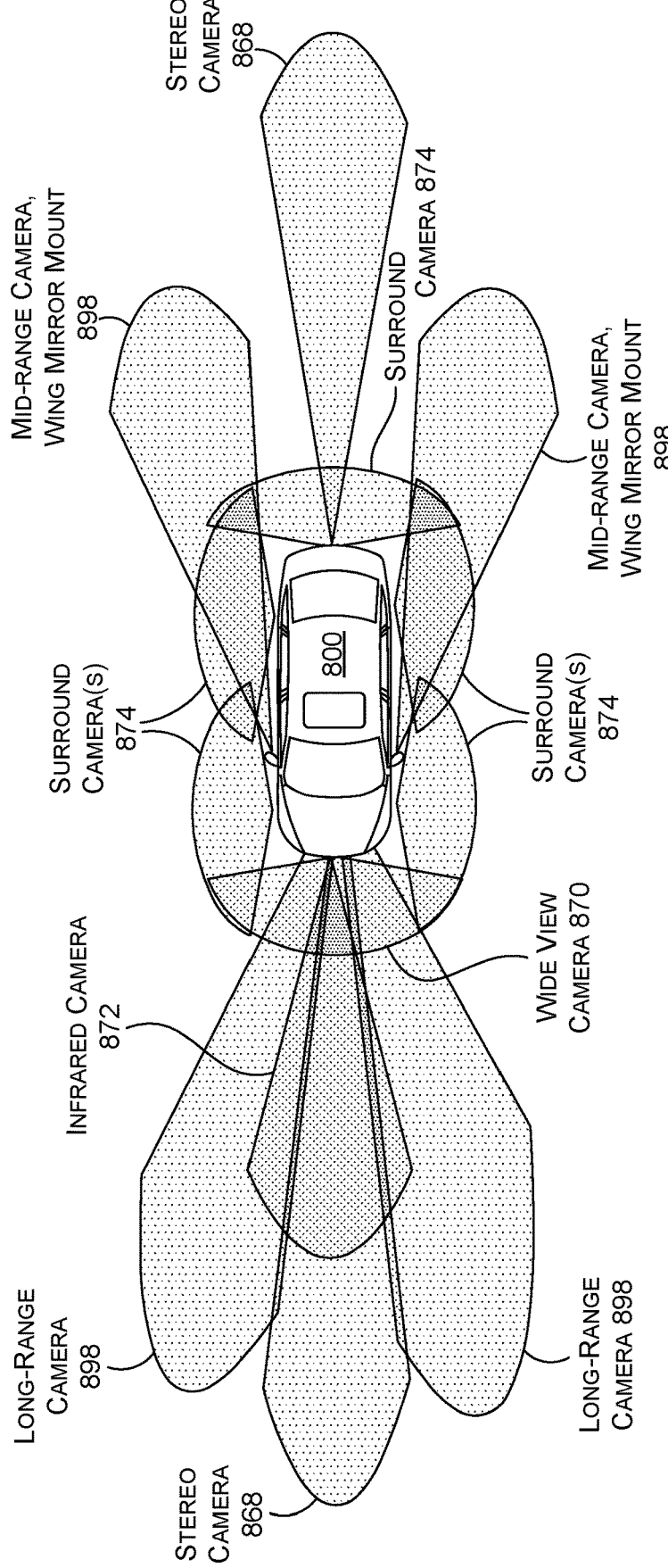
FIG. 8B is an example of camera locations and fields of view for the example autonomous vehicle of FIG. 8A, in accordance with some embodiments of the present disclosure.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 800 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may any number of wide-view cameras 870 on the vehicle 800. In addition, long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

One or more stereo cameras 868 may also be included in a front-facing configuration. The stereo camera(s) 868 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that include portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle 800. The surround camera(s) 874 may include wide-view camera(s) 870, fisheye camera(s), 360 degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

Figure 8C:
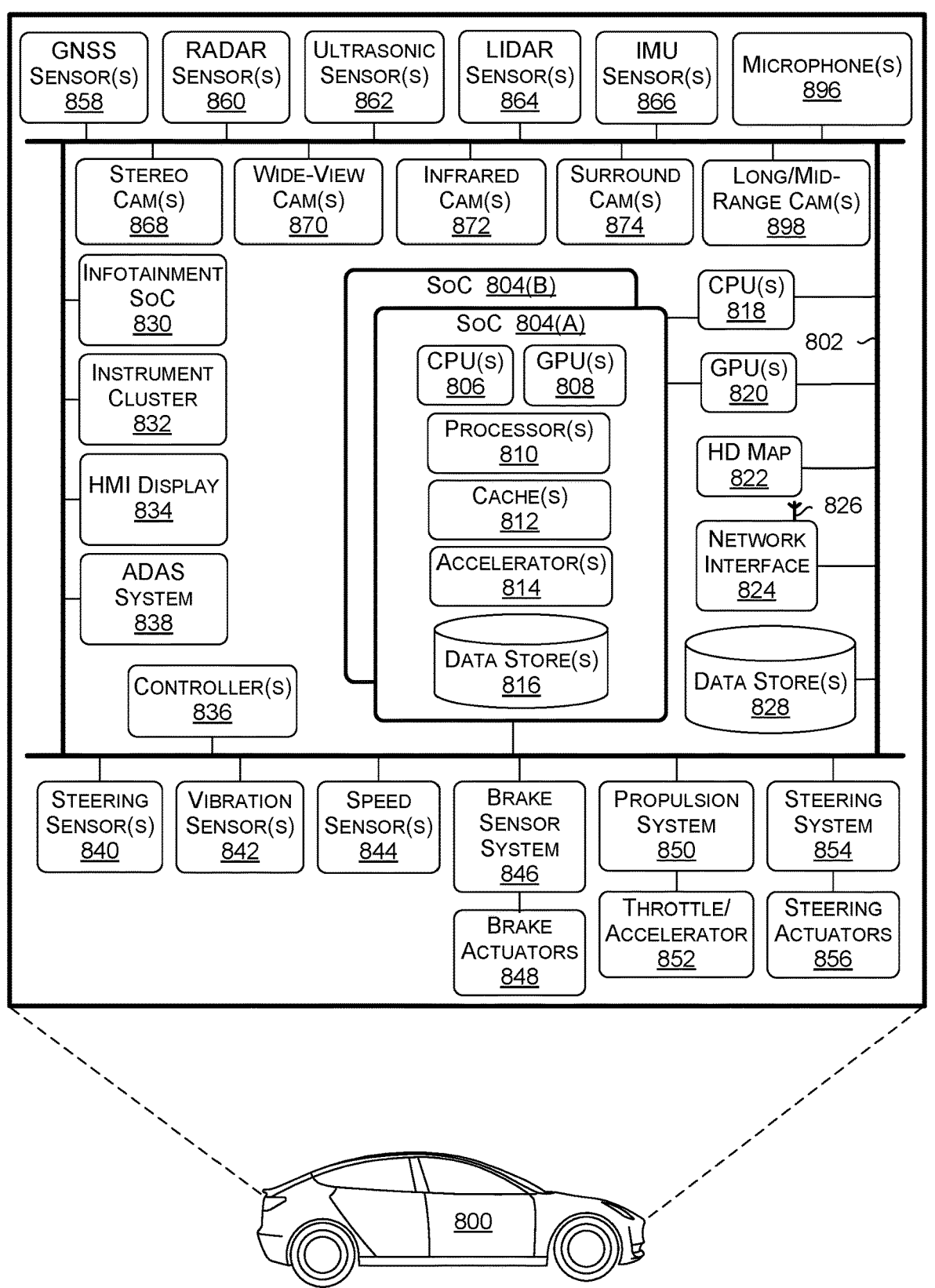
FIG. 8C is a block diagram of an example system architecture for the example autonomous vehicle of FIG. 8A, in accordance with some embodiments of the present disclosure.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C are illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800, and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s))— or other math coprocessor or numeric coprocessor types— for performing mathematical operations within the system. For example, the SoC(s) 104 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 866 output that correlates with the vehicle 800 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 812 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, that use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858. The GNSS sensor(s) 858 (e.g., GPS, assisted GPS sensors, differential GPS (DGPS) sensors, etc.), to assist in mapping, perception, occupancy grid generation, and/or path planning functions. Any number of GNSS sensor(s) 858 may be used, including, for example and without limitation, a GPS using a USB connector with an Ethernet to Serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 800 surroundings at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 800 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 800 m, with an accuracy of 2 cm-3 cm, and with support for a 800 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 800. The LIDAR sensor(s) 864, in such examples, may provide up to a 120-degree horizontal and 35-degree vertical field-of-view, with a 200 m range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 800. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include a SoC, in some examples. The ADAS system 838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjust the vehicle speed to maintain a safe distance from vehicles ahead. Lateral ACC performs distance keeping, and advises the vehicle 800 to change lanes when necessary. Lateral ACC is related to other ADAS applications such as LCA and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 800), while the I2V communication concept provides information about traffic further ahead. CACC systems may include either or both I2V and V2V information sources. Given the information of the vehicles ahead of the vehicle 800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network which is trained and thus reduces the risk of false positives, as described herein.

The vehicle 800 may further include the infotainment SoC 830 (e.g., an in-vehicle infotainment system (IVI)). Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 800. For example, the infotainment SoC 830 may radios, disk players, navigation systems, video players, USB and Bluetooth connectivity, carputers, in-car entertainment, Wi-Fi, steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 9:
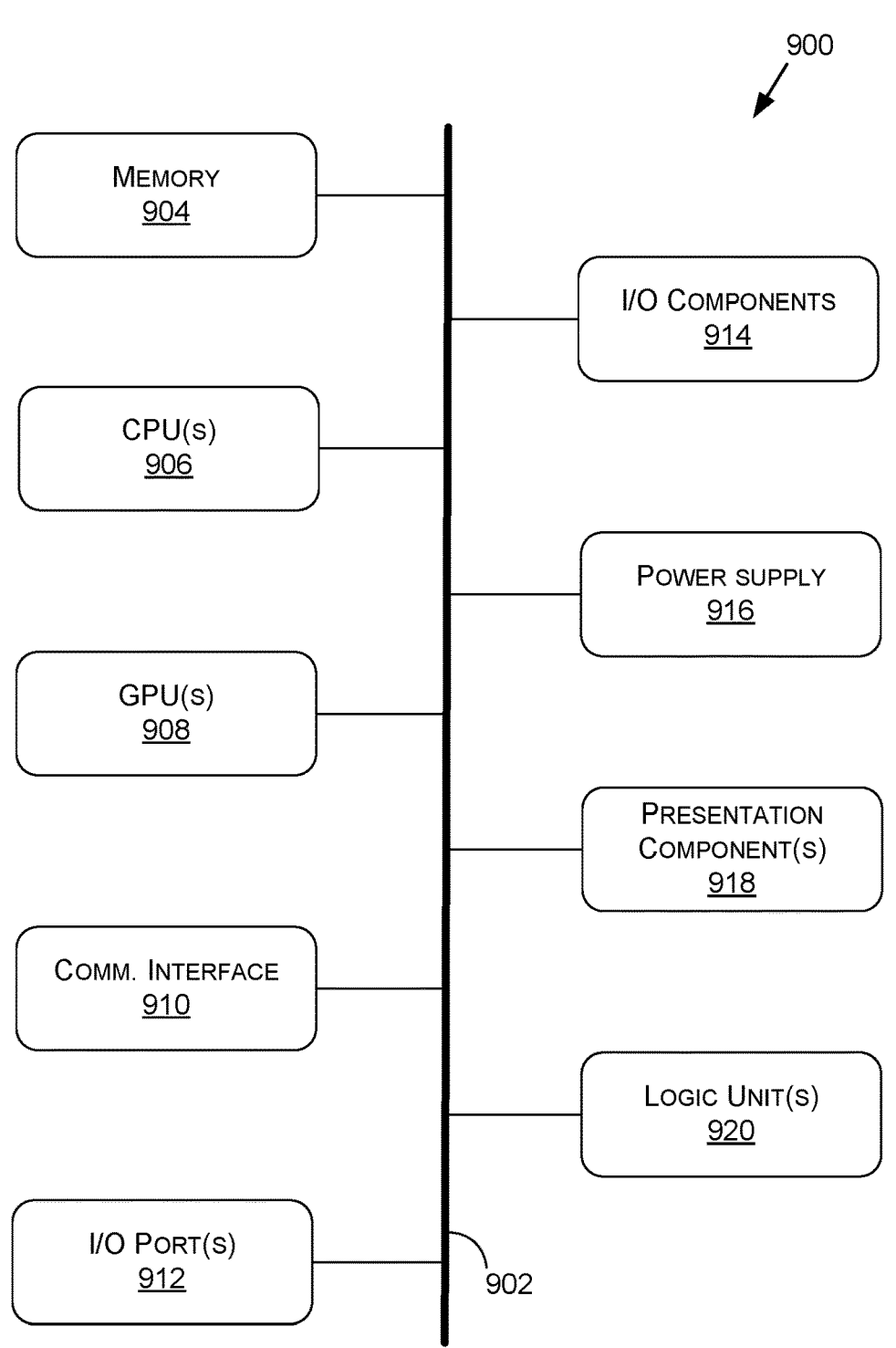
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 920 and/or communication interface 910 may include one or more data processing units (DPUs) to transmit data received over a network and/or through interconnect system 902 directly to (e.g., a memory of) one or more GPU(s) 908.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, DPUs, etc.), and output the data (e.g., as an image, video, sound, etc.).

Example Data Center

Figure 10:
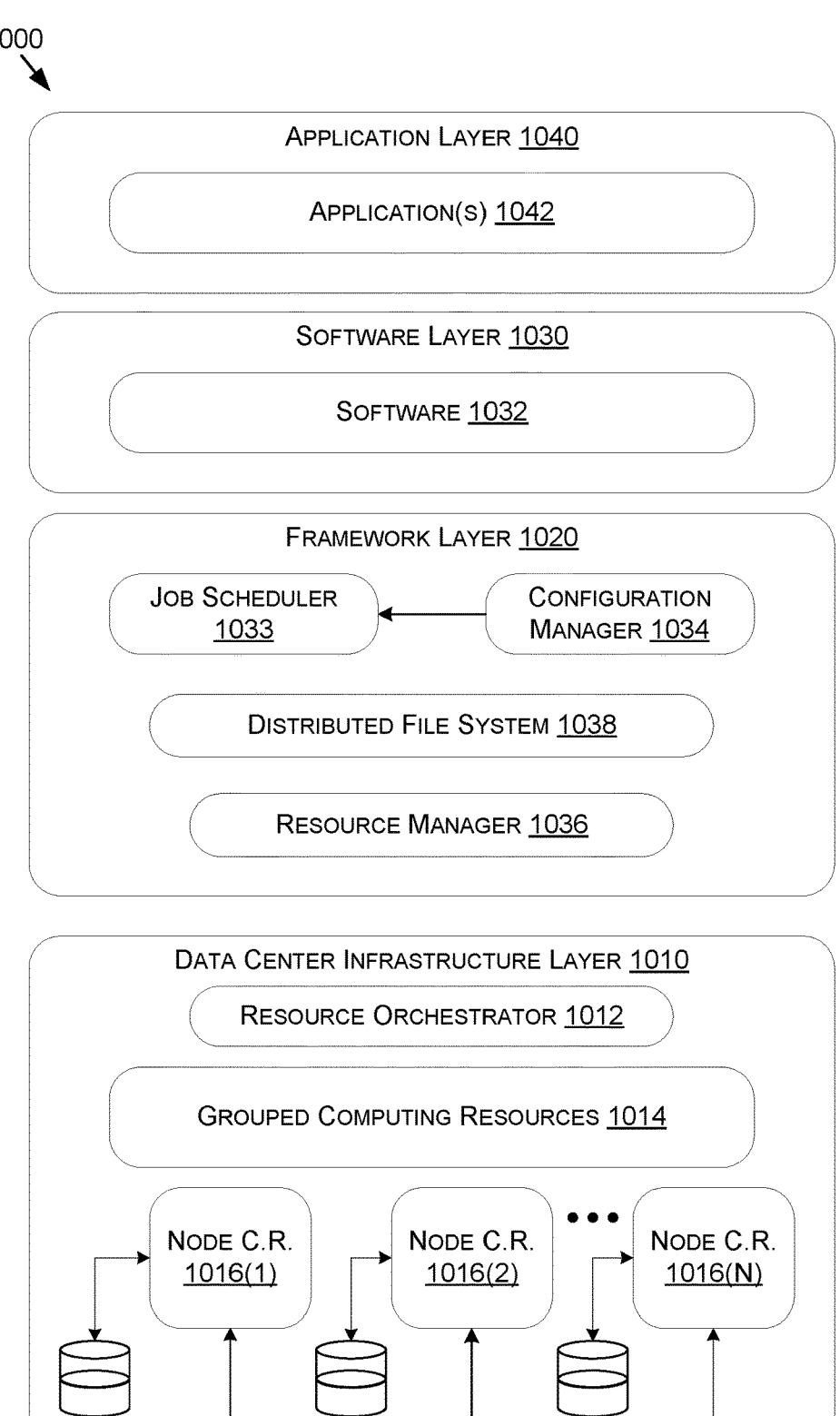
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161 (N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1012 may configure or otherwise control one or more node C.R.s 1016(1)-1016(N) and/or grouped computing resources 1014. In at least one embodiment, resource orchestrator 1012 may include a software design infrastructure (SDI) management entity for the data center 1000. The resource orchestrator 1012 may include hardware, software, or some combination thereof.

In at least one embodiment, as shown in FIG. 10, framework layer 1020 may include a job scheduler 1033, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1033 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1033. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016(1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:
   one or more processors to perform operations including:
      determining, based at least on sensor data obtained using at least one sensor of a machine, a path for the machine to traverse an area in an environment;
      applying, to the path, at least two categories of yield behavior that encode one or more traffic rules using a sequence of steps for controlling the machine with respect to one or more contention points of the area to comply with the one or more traffic rules, a first category of the at least two categories having a first step including a yield maneuver, and one or more first conditions for transitioning to a subsequent yield maneuver in second step of a second category of the at least two categories in the sequence, the second step including one or more second conditions for terminating the sequence of steps based at least on clearing the one or more contention points;
      based at least on the applying and detecting an entrance to the area along the path, controlling the machine to traverse the area using the path and the at least two categories of yield behavior, the controlling including tracking, using the one or more first conditions and the one or more second conditions, progress of the machine through the steps of the sequence to advance the machine along the path through the area, and ending the use of the sequence of steps for the controlling based at least on determining the one or more second conditions are satisfied.

2. The system of claim 1, wherein the one or more first conditions correspond to at least one of:
   a speed of the machine;
   a distance of the machine to at least one contention point of the one or more contention points; or
   a wait time for the machine.

3. The system of claim 1, wherein the first category of yield behavior includes a stop with respect to at least one contention point of the one or more contention points until the one or more first conditions are satisfied.

4. The system of claim 1, wherein the first category of yield behavior is applied to a first segment of the path to generate a first portion of a trajectory that corresponds to the first category of yield behavior, and the operations further include applying, to a second segment of the path, the second category of yield behavior to generate a second portion of the trajectory that corresponds to the second category of yield behavior.

5. The system of claim 1, wherein the controlling initiates the use of the sequence of steps for the controlling based at least on the detecting of the entrance to the area along the path, and the ending the use of the sequence of steps for the controlling is based at least on detecting an exit to the area along the path.

6. The system of claim 1, wherein the applying is based at least on selecting the at least two categories of yield behavior as a subset of primitive states based at least on matching the area to the subset of primitive states.

7. The system of claim 1, wherein the operations further include:
   localizing the machine to one or more locations in a map of the environment, wherein the map encodes the one or more traffic rules that correspond to the one or more locations;
   detecting, using perception components of the machine, one or more dynamic traffic signal states in the environment; and
   based at least on the localizing, selecting, for the applying, the first category of yield behavior from a plurality of categories of yield behavior based at least on the first category of yield behavior corresponding to the one or more traffic rules and the one or more dynamic traffic signal states.

8. The system of claim 1, wherein the sequence of steps is represented as a state machine in which each step of the steps corresponds to a respective state of the state machine.

9. The system of claim 1, wherein the system is comprised in at least one of:
   a control computing system for an autonomous or semi-autonomous machine;
   a perception computing system for an autonomous or semi-autonomous machine;
   a system for performing simulation operations;
   a system for performing deep learning operations;
   a system implemented using an edge computing device;
   a system implemented using a robot;
   a system incorporating one or more virtual machines (VMs);
   a system implemented at least partially in a data center; or
   a system implemented at least partially using cloud computing resources.

10. A method comprising:
   selecting, for a path and based at least on sensor data obtained using at least one sensor of a machine, at least two categories of yield behavior that encode one or more traffic rules using a sequence of steps for controlling the machine with respect to one or more contention points of an area in an environment to comply with the one or more traffic rules, a first category of the at least two categories having a first step including a yield maneuver, and one or more first conditions for transitioning to a subsequent yield maneuver in a second step of a second category of the at least two categories in the sequence, the second step including one or more second conditions for terminating the sequence of steps based at least on clearing the one or more contention points;
   based at least on the selecting and detecting an entrance to the area along the path, controlling the machine to traverse the area using the path and the at least two categories of yield behavior, the controlling including tracking, using the one or more first conditions and the one or more second conditions, progress of the machine through the steps of the sequence to advance the machine along the path through the area, and ending the use of the sequence of steps for the controlling based at least on determining the one or more second conditions are satisfied.

11. The method of claim 10, wherein the detecting of the entrance along the path signals a beginning of the use of the sequence of the steps for the controlling of the machine.

12. The method of claim 10, wherein the one or more first conditions correspond to at least one of a wait time for the machine, a speed of the machine, or a distance of the machine to at least one contention point of the one or more contention points.

13. The method of claim 10, wherein the controlling prevents the machine from advancing along the path until jointly determining that each step in the sequence of steps is capable of being cleared without collision.

14. The method of claim 10, wherein the at least two categories of yield behavior include a stop at entry category and a yield contention point category.

15. The method of claim 10, comprising:

localizing, using the sensor data, the machine to one or more locations in a map of the environment, wherein the map encodes the one or more traffic rules that correspond to the one or more locations; and detecting, using perception components of the machine, one or more dynamic traffic signal states in the environment, wherein the selecting of the at least two categories of yield behavior is from a plurality of categories of yield behavior based at least on the at least two categories of yield behavior corresponding to the one or more traffic rules and the one or more dynamic traffic signal states.

16. At least one processor comprising:

one or more circuits to, based at least on detecting an entrance to an area in an environment along a path, control a machine to traverse the area using the path and at least two categories of yield behavior assigned to the path, the at least two categories of yield behavior encoding one or more traffic rules using a sequence of steps for controlling the machine with respect to one or more contention points of the area to comply with the one or more traffic rules, a first category of the at least two categories having a first step including a yield maneuver, and one or more first conditions for transitioning to a subsequent yield maneuver in a second step of a second category of the at least two categories in the sequence, the second step including one or more second conditions for terminating the sequence of steps based at least on clearing the one or more contention points, and the control including tracking, using the one or more first conditions and the one or more second conditions, progress of the machine through the steps of the sequence to advance the machine along the path through the area, and ending the use of the sequence of steps for the control based at least on determining the one or more second conditions are satisfied.

17. The at least one processor of claim 16, wherein the second category of yield behavior is defined with respect to:

one or more crossing points between the path for the machine and one or more paths for one or more agents; or one or more merge points between the path for the machine and the one or more paths for the one or more agents.

18. The at least one processor of claim 16, wherein the second category of yield behavior includes a yield with respect to at least one contention point between the machine and one or more agents until the one or more second conditions are satisfied.

19. The at least one processor of claim 16, wherein the control uses a trajectory including a first portion corresponding to the first category of yield behavior, and a second portion corresponding to the second category of yield behavior.

20. The at least one processor of claim 16, wherein the at least one processor is comprised in at least one of:

a control computing system for an autonomous or semi-autonomous machine;

a perception computing system for an autonomous or semi-autonomous machine;

a system for performing simulation operations;

a system for performing deep learning operations;

a system implemented using an edge computing device;

a system implemented using a robot;

a system incorporating one or more virtual machines (VMs);

a system implemented at least partially in a data center; or a system implemented at least partially using cloud computing resources.

* * * * *